(12) United States Patent
Olson et al.

(10) Patent No.: US 10,843,458 B1
(45) Date of Patent: *Nov. 24, 2020

(54) METHOD AND APPARATUS FOR THREE-DIMENSIONAL DIGITAL PRINTING

(71) Applicant: 3DPhotoWorks LLC, Chatham, NY (US)

(72) Inventors: John Stewart Olson, Chatham, NY (US); Angelo Raymond Quattrociocchi, Mississauga (CA)

(73) Assignee: 3DPhotoWorks LLC, Chatham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,095

(22) Filed: Jun. 23, 2015

Related U.S. Application Data

(63) Continuation of application No. 13/031,249, filed on Feb. 21, 2011, now Pat. No. 9,061,521.

(60) Provisional application No. 61/385,544, filed on Sep. 22, 2010.

(51) Int. Cl.
*B41J 3/407* (2006.01)
*B41J 2/01* (2006.01)

(52) U.S. Cl.
CPC ............. *B41J 2/01* (2013.01); *B41J 3/4073* (2013.01)

(58) Field of Classification Search
CPC ................................ B41J 3/4073; B41J 2/01
See application file for complete search history.

(56) References Cited

U.S. PATENT DOCUMENTS

| | | | |
|---|---|---|---|
| 6,095,630 A | * | 8/2000 | Horii ............... B41J 2/04573 347/10 |
| 6,357,868 B1 | | 3/2002 | Pfaff et al. |
| 6,360,656 B2 | | 3/2002 | Kubo et al. |

(Continued)

FOREIGN PATENT DOCUMENTS

| | | |
|---|---|---|
| EP | 1201432 A1 | 5/2002 |
| EP | 2 100 744 A1 | 9/2009 |

(Continued)

OTHER PUBLICATIONS

International Search Report and Written Opinion, International App. PCT/US2012/025883, dated May 21, 2012, 10 pages.

(Continued)

*Primary Examiner* — Yaovi M Ameh
(74) *Attorney, Agent, or Firm* — Kaplan IP Law, PLLC; Jonathan T. Kaplan

(57) ABSTRACT

Techniques are presented for digital ink jet printing upon a substrate with a significant third dimension. Droplets in the range of 120 pL to 200 pL have been found suitable for substrates with variability, in the third dimension, of up to approximately 4 cm. A larger droplet can be generated by utilizing a plurality of drive pulses, each of which generates a smaller droplet, and having the plurality of smaller droplets combine in mid-air. The data to be printed can be derived from a 3D model and such 3D model can also be used to guide shaping of the substrate. The 3D model can be produced from 2D image data. If the 2D image data is a two-dimensional portrait photograph, a result, of using the present invention, can be a realistic portrait in the form of a bas-relief sculpture.

11 Claims, 22 Drawing Sheets

(56) References Cited

U.S. PATENT DOCUMENTS

| | | | |
|---|---|---|---|
| 6,387,168 B1* | 5/2002 | Koitabashi | C09D 11/40 |
| | | | 106/31.28 |
| 6,488,349 B1* | 12/2002 | Matsuo | B41J 2/04581 |
| | | | 347/11 |
| 6,523,921 B2 | 2/2003 | Codos | |
| 6,755,518 B2 | 6/2004 | Codos | |
| 6,859,988 B2* | 3/2005 | Lovchik | B27C 9/00 |
| | | | 144/117.1 |
| 7,001,016 B2 | 2/2006 | Baxter et al. | |
| 7,168,803 B2 | 1/2007 | Baxter et al. | |
| 7,520,602 B2 | 4/2009 | Codos | |
| 7,766,474 B2 | 8/2010 | Baxter et al. | |
| 7,854,796 B2* | 12/2010 | Tokita | B41M 5/0017 |
| | | | 106/31.13 |
| 9,061,521 B2* | 6/2015 | Olson | B41J 3/4073 |
| 2001/0017085 A1* | 8/2001 | Kubo | B41F 17/00 |
| | | | 101/35 |
| 2001/0019340 A1 | 9/2001 | Kubo et al. | |
| 2004/0100512 A1* | 5/2004 | Codos | B41J 3/28 |
| | | | 347/8 |
| 2005/0157148 A1* | 7/2005 | Baker | B41J 3/407 |
| | | | 347/106 |
| 2005/0195229 A1 | 9/2005 | Barss | |
| 2006/0019042 A1* | 1/2006 | Nojima | B41M 5/52 |
| | | | 428/32.24 |
| 2007/0042142 A1 | 2/2007 | O'Brien et al. | |
| 2007/0132806 A1* | 6/2007 | Baxter | B41J 3/4073 |
| | | | 347/21 |

FOREIGN PATENT DOCUMENTS

| | | | | |
|---|---|---|---|---|
| GB | 2403883 A | | 1/2005 | |
| JP | 09193368 A | | 1/1997 | |
| JP | 2002-178496 A | | 6/2002 | |
| JP | 2002178496 A | * | 6/2002 | |
| JP | 2007-331257 | * | 12/2007 | B44C 1/22 |
| JP | 2007-331257 A | | 12/2007 | |
| JP | 2007331257 A | * | 12/2007 | B44C 1/22 |

OTHER PUBLICATIONS

International Preliminary Report on Patentability, International App. PCT/US2012/025883, dated Aug. 21, 2013, 6 pages.
Office Action, EPO App. 12 706 994, dated Jul. 13, 2017, 10 pages.
European Patent Office; Office Action dated Jun. 3, 2019 (y/m/d); 8 pgs.
Australian Patent Office; Office Action dated Oct. 16, 2018 (y/m/d); 4 pgs.

* cited by examiner

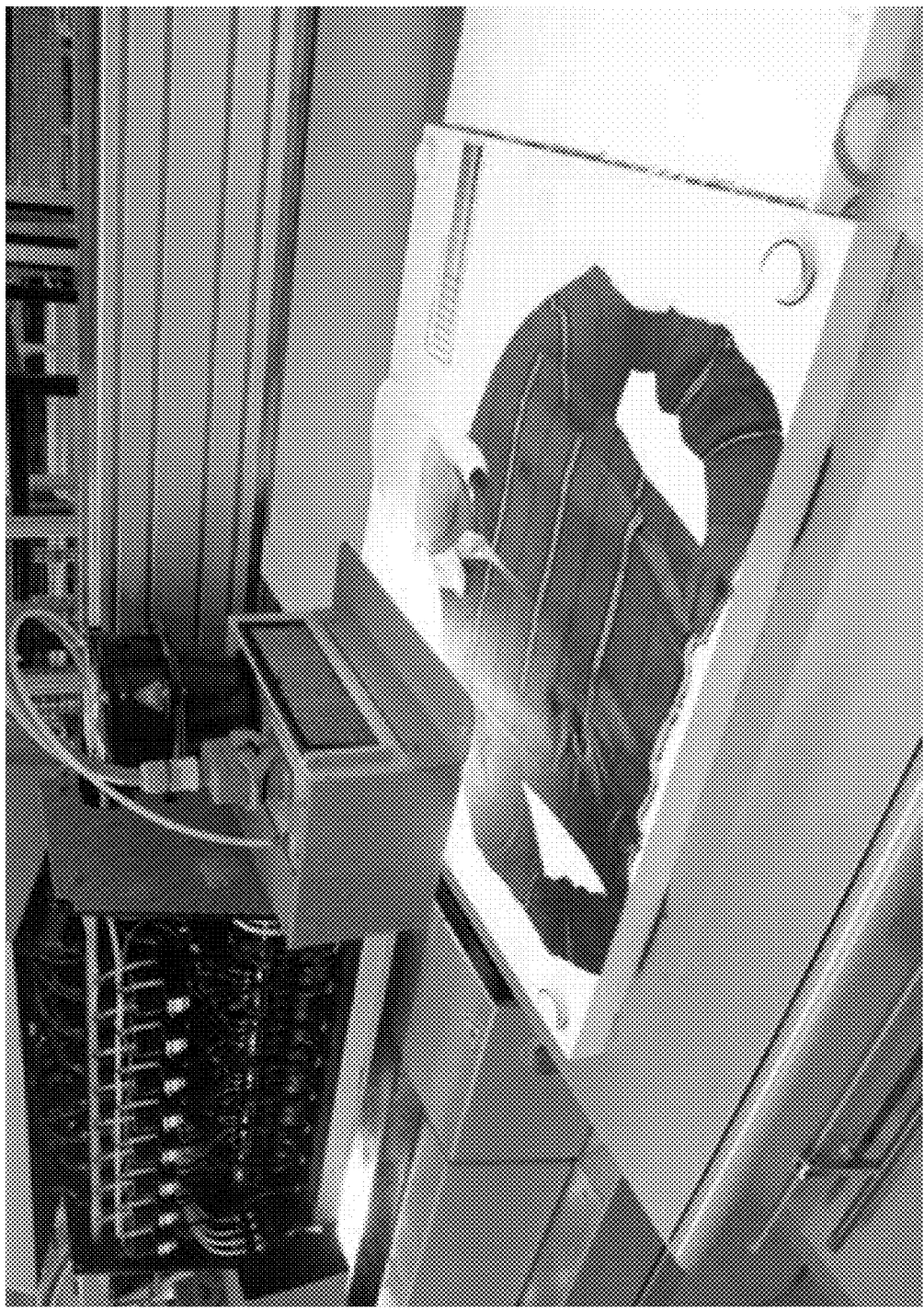

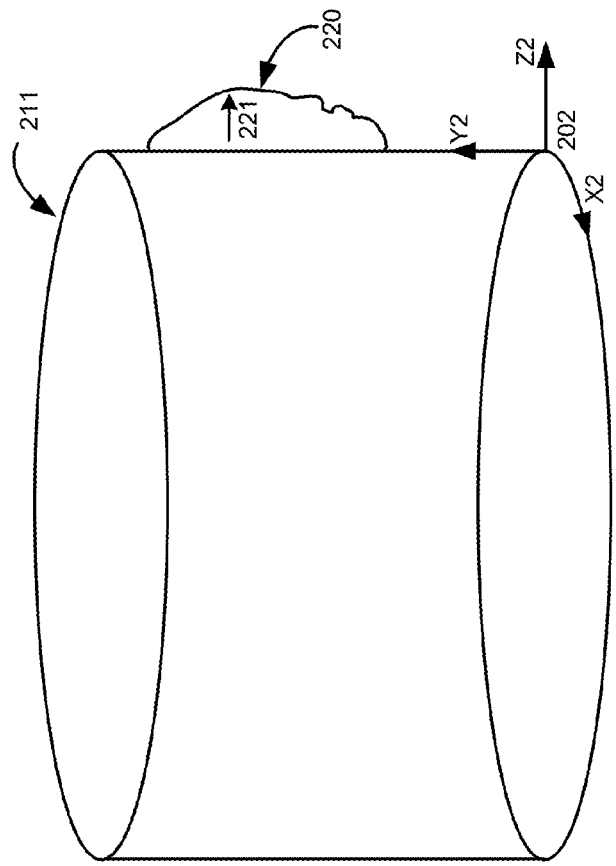
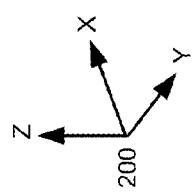
FIGURE 2C

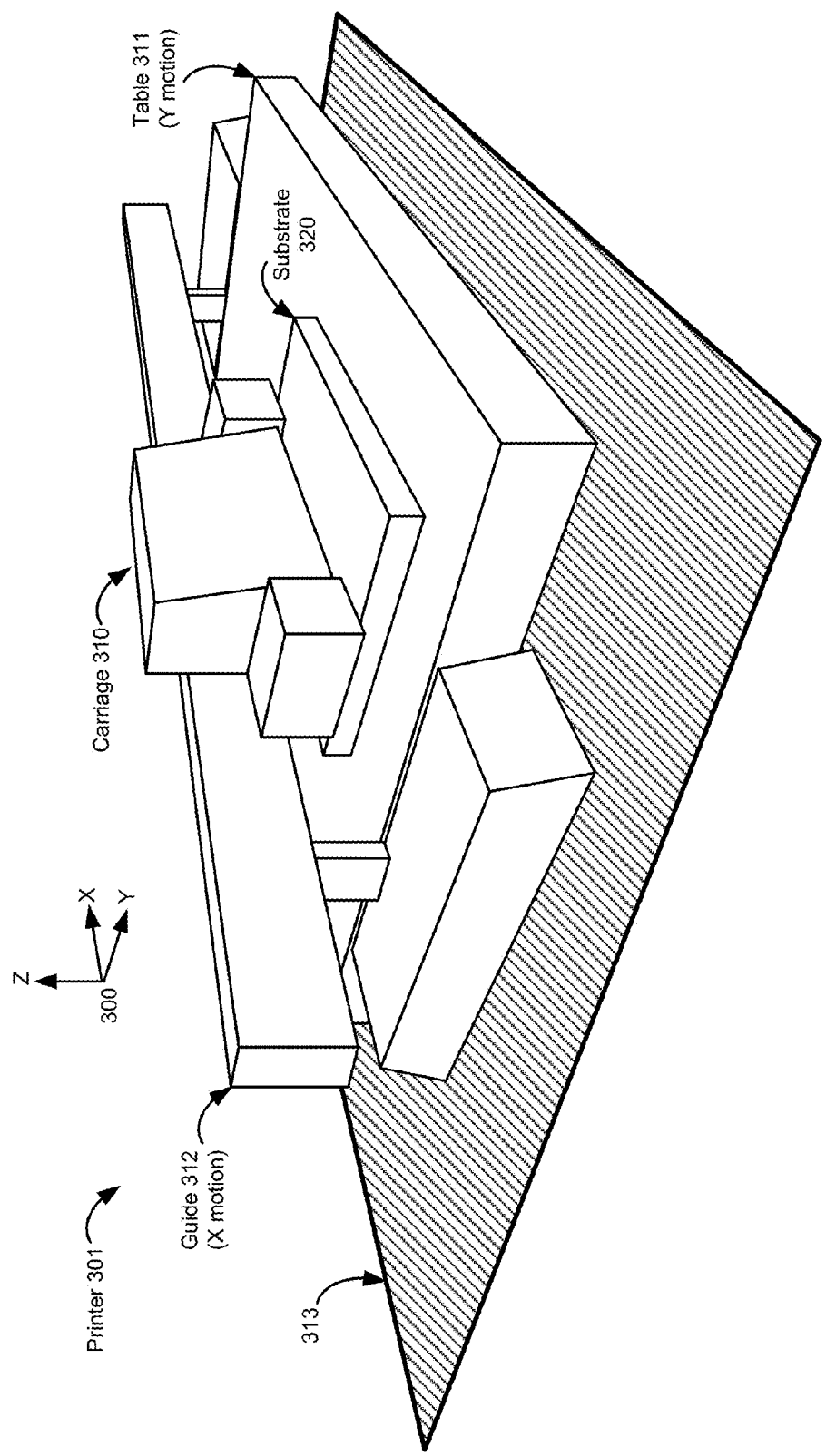

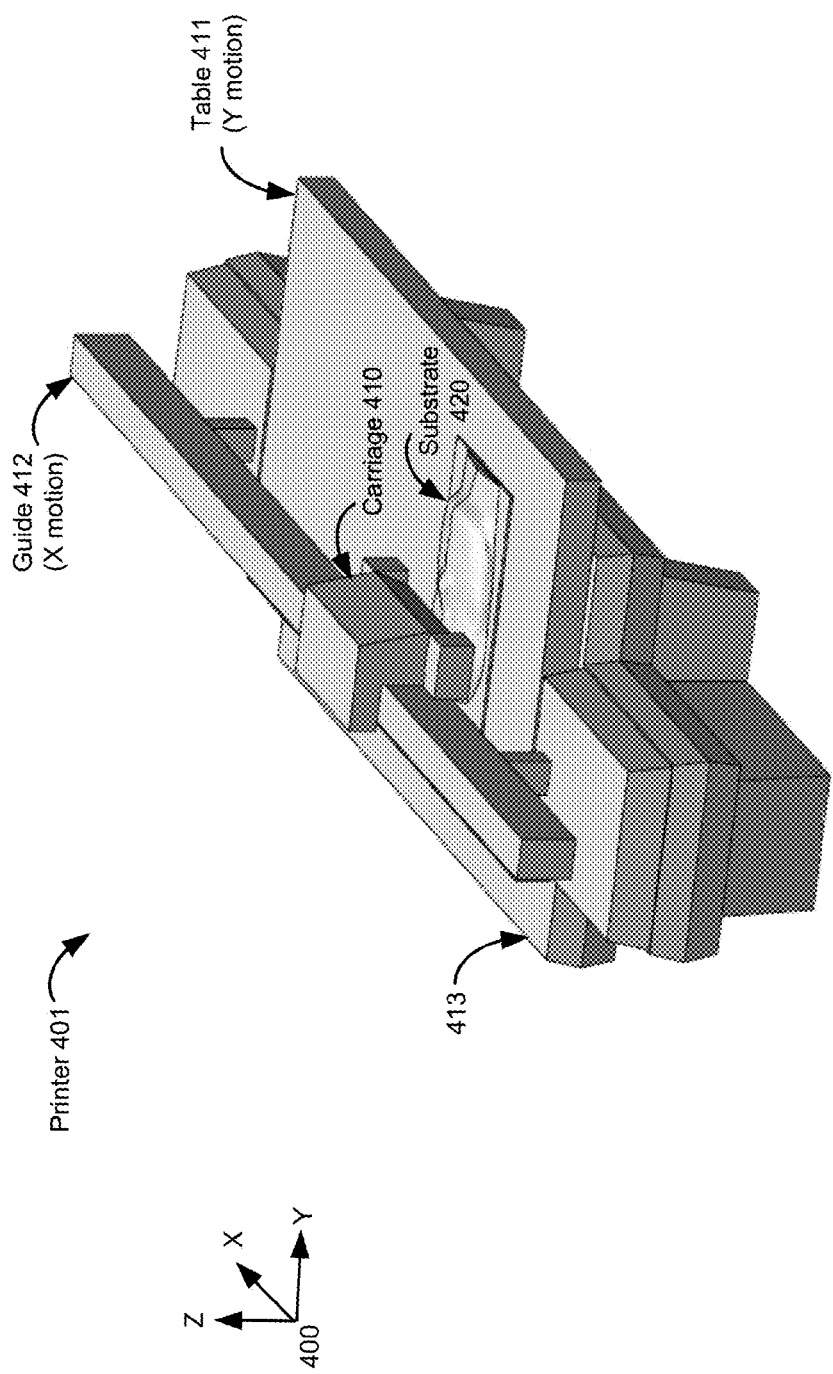

SECTION G-G

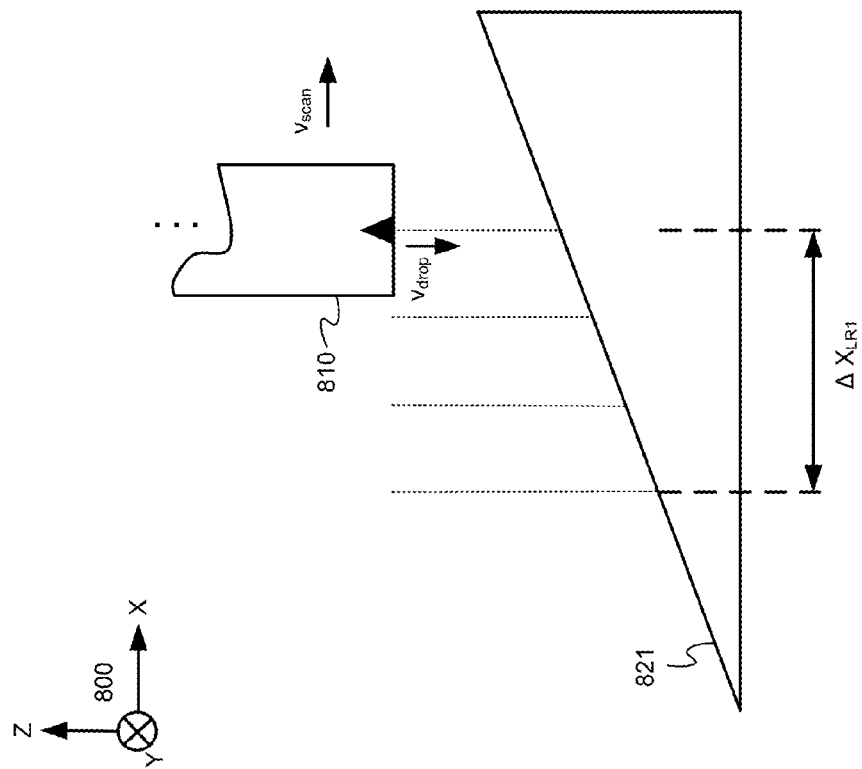
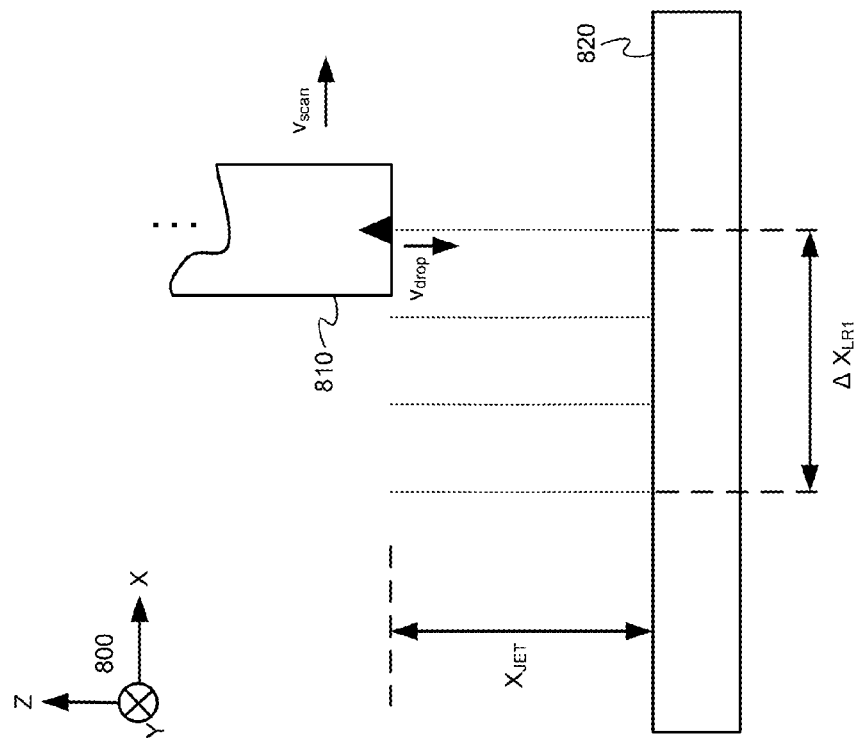

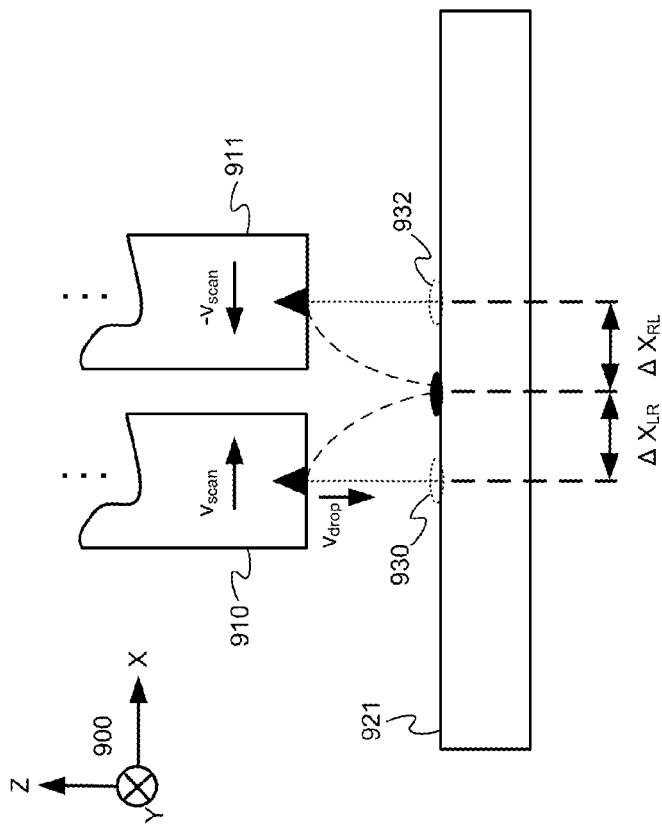
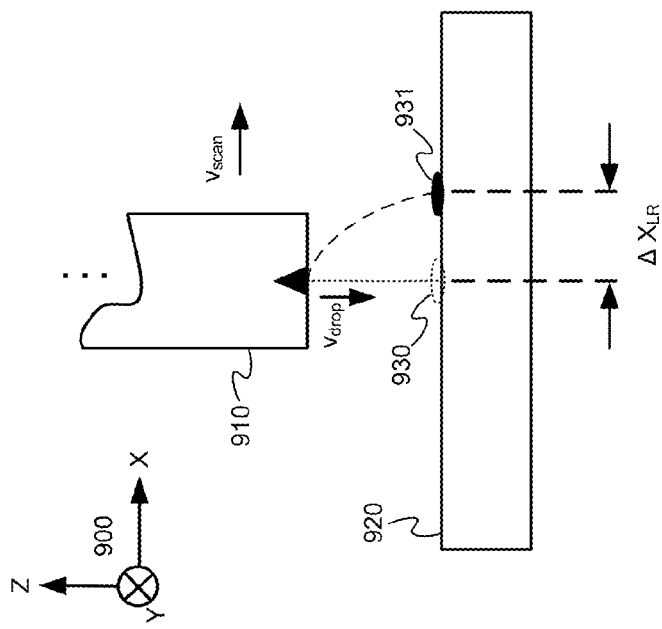

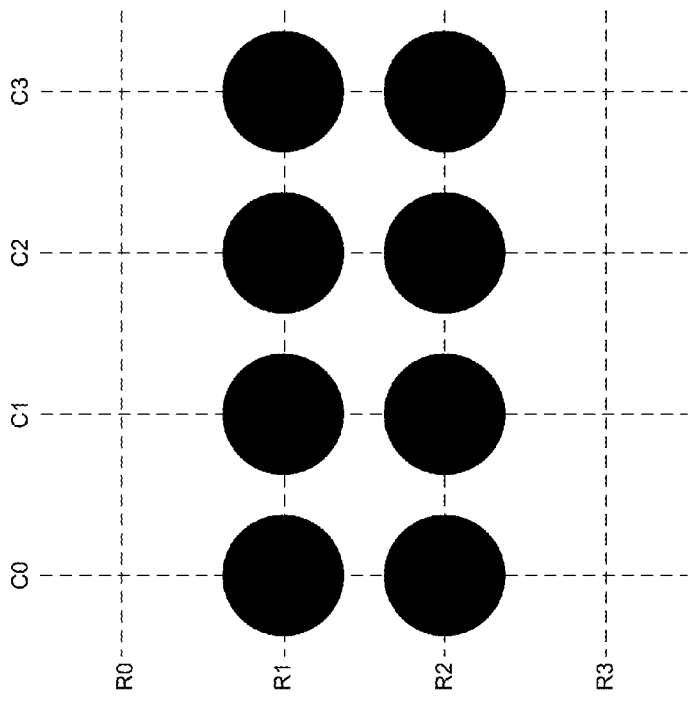
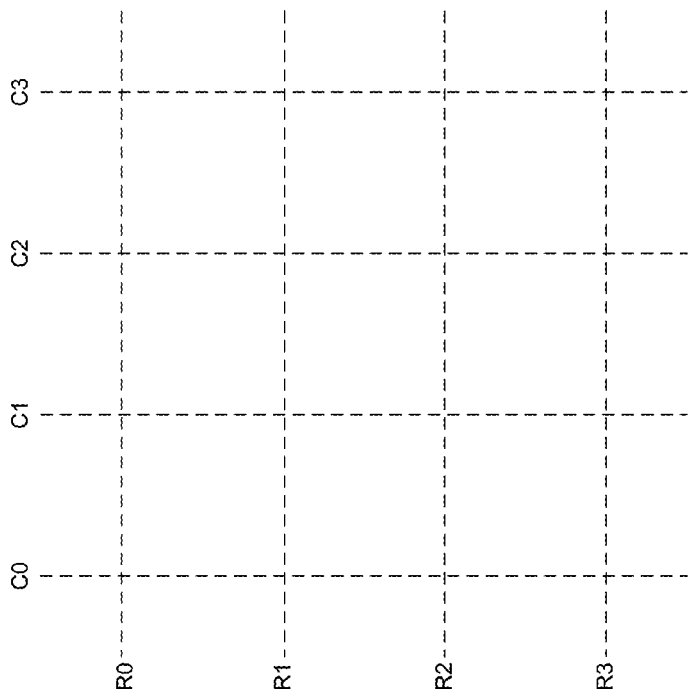

METHOD AND APPARATUS FOR THREE-DIMENSIONAL DIGITAL PRINTING

As provided for under 35 U.S.C. § 120, this patent claims benefit of the filing date for the following U.S. patent application, herein incorporated by reference in its entirety:

"Method and Apparatus For Three-Dimensional Digital Printing," filed 2011 Feb. 21 (y/m/d), having inventors John Stewart Olson, and Angelo Raymond Quattrociocchi, and application Ser. No 13/031,249.

As provided for under 35 U.S.C. § 119(e), application Ser. No. 13/031,249 claimed benefit of the filing date of the following U.S. provisional patent application:

"Method and Apparatus For Three-Dimensional Digital Printing," filed 2010 Sep. 22 (y/m/d), having inventors John Stewart Olson and Angelo Raymond Quattrociocchi, and App. No. 61/385,544.

CROSS REFERENCE TO RELATED APPLICATION

This application is related to the following U.S. patent application, all of which is herein incorporated by reference in its entirety:

"Method and Apparatus For Three-Dimensional Digital Printing," filed 2010 Sep. 22 (y/m/d), having inventors John Stewart Olson, and Angelo Raymond Quattrociocchi, and App. No. 61/385,544.

FIELD OF THE INVENTION

The present invention relates to digital printing on a three-dimensional substrate, and more particularly to the use of ink jet printing technology.

BACKGROUND OF THE INVENTION

The utility of two-dimensional digital printing processes, whereby ink is deposited on a two-dimensional substrate in accordance with digital data, is well known. However, relatively little attention has been given to the issue of ink deposition on a substrate with a significant third dimension.

This is despite the fact that three-dimensionality has long been known as an effective communication tool. For example, the Parthenon of Ancient Greece, constructed around 447-438 BC, was decorated with elaborate low relief sculpture called the "Parthenon Frieze" or "Elgin Marbles." This relief sculpture is widely regarded as some of the greatest artwork ever created. The effectiveness of the deposition of color, for relief sculpture, has also long been recognized. In fact, the Parthenon Frieze itself is known to have been painted by the Ancient Greeks.

There are, of course, numerous additional examples of the utility of three-dimensionality for effective communication and/or representation. Another example is the area of portraiture, in which the "likeness" of a person can be preserved by a sculpture or "bust." Prior to the invention of photography, the preservation of a person's likeness, in either two-dimensional (e.g., a painting) or three-dimensional form, was reserved for those persons of sufficient wealth and/or importance to warrant the artistic labor necessary. The advent of photography greatly democratized the production of two-dimensional portraiture, but the use of sculpture has remained a technique still largely reserved for the wealthy and/or powerful.

The mass commercialization of two-dimensional imagery has led, in modern times, to the pursuit of ever more "realistic" and accurate two-dimensional print processes. Such improvements in two-dimensional printing have led to ink deposition technologies that are increasingly suitable for only two-dimensional use. For example, with regard to "ink jet" technology, production of higher resolution printing (e.g., advancing the "dots per inch" or "dpi" from 600 to 1200) has been achieved by the production of smaller ink droplets. To utilize the greater resolution of the smaller droplets, the "flight distance" (i.e., the distance between the print head nozzles and the surface of the substrate) of modern ink jet printers has been steadily reduced. This is due to the fact that, in general, a greater flight distance provides greater opportunity for the introduction of errors into the trajectory of the ink drops.

It would therefore be useful to "re-think" ink jet printing technology, and it's evolution, from the perspective of printing upon a three-dimensional substrate, and thereby offer more opportunity for the use of sculptural effects in the process of producing effective communication and/or artistic works.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1D illustrates an ink jet printer, constructed in accordance with principles of the present invention, depositing the 3D model of FIG. 1B upon the 3D substrate of FIG. 1C.

FIG. 2C shows a tubular substrate shape, formed from the curving of a 2D base.

FIG. 3A shows an example generic digital inkjet printer.

FIG. 4 depicts an example ink jet printer very similar to that depicted in FIG. 3A.

FIG. 8A presents a simplified illustration of conventional 2D digital inkjet printing.

FIG. 8B presents a right triangle 3D substrate in order to explain why slope error occurs.

FIG. 9A illustrates dynamic error for 2D unidirectional printing.

FIG. 9B illustrates dynamic error for 2D bidirectional printing.

FIG. 11A shows an example grid within which are 16 locations where a droplet can be placed.

FIG. 11B shows the same grid as FIG. 11A, except that a black horizontal line, parallel to the X axis, has been formed.

DETAILED DESCRIPTION OF PREFERRED EMBODIMENTS

Figure 1A:
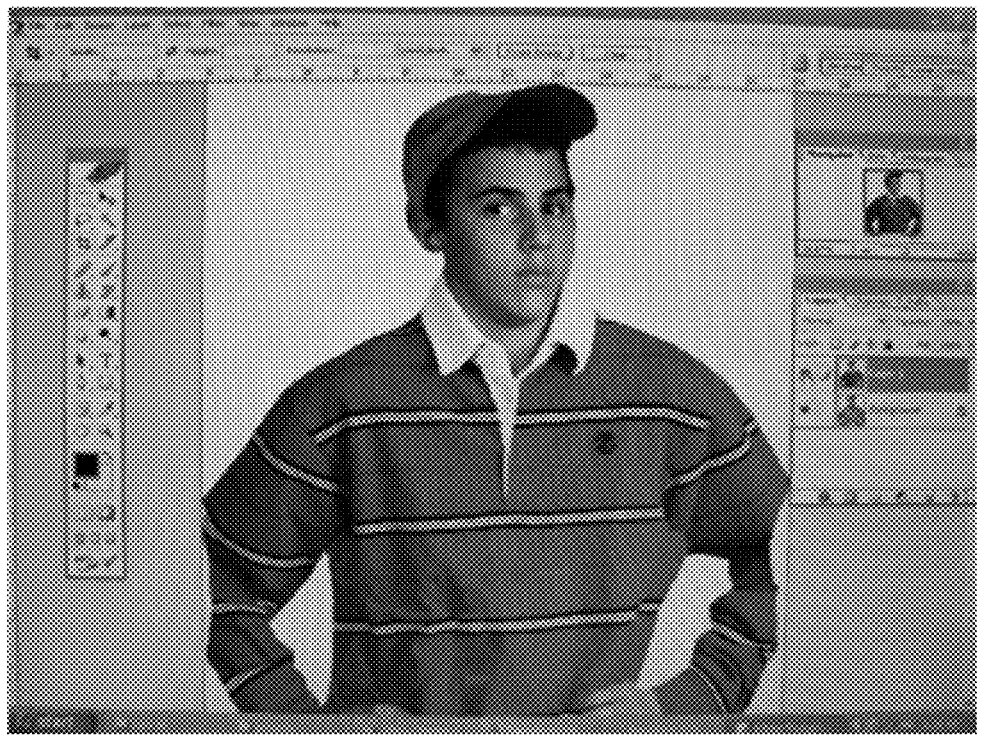
FIG. 1A depicts an example of 2D image data, in the form of a portrait photograph.

Reference will now be made in detail to various embodiments of the invention, examples of which are illustrated in the accompanying drawings. Wherever possible, the same reference numbers will be used throughout the drawings to refer to the same or like parts.

Throughout the following description, unless indicated otherwise by the context, the terms "three-dimensional" and "3D" are used interchangeably. Similarly, the terms "two-dimensional" and "2D" are used interchangeably. Also, at least the following abbreviations are used: mm (millimeter), cm (centimeter), pL (picoliter), and dpi (dots-per-inch).

Table of Contents to Detailed Description

1 Overview
2 Three-Dimensional Modeling
3 Substrate Preparation
   3.1 Overview
   3.2 Brightness
   3.3 Texture
   3.4 Chemical Compatibility
4 Producing Print Data
5 Printing
   5.1 Overview
   5.2 Conventional
   5.3 3D Printing
      5.3.1 Drop Integrity
      5.3.2 Slope Errors
      5.3.3 Dynamic Slope Errors
6 Control/Computing Systems

1 Overview

The present invention relates to printing any pattern (referred to herein as the "substrate pattern") with ink jet technology on any three-dimensional substrate (or "3D substrate") wherein:

1. a two-dimensional space can be defined (called herein a "2D base") and,
2. relative to such 2D base, there is substantial variability in a third dimension.

The dimensions of the 2D base can be referred to as X, Y, while the third dimension can be called Z. The variation in the Z dimension adds a kind of topography to the 2D base. The term "substrate pattern," as used herein, encompasses any kind of pattern or design, photographically based, synthesized or produced in any other way (or any combination of ways of production), that a user desires to print upon a 3D substrate.

The above-described type of printing can be referred to herein as "three-dimensional printing" (or "3D printing"). While any pattern can be printed, the below description focuses upon a process whereby 2D image data is adapted for printing upon a 3D substrate and, also, a 3D model (produced from the 2D image) can be used to guide the production of the 3D substrate.

If, for example, the 2D image data is a realistic but two-dimensional photograph of a person (e.g., a portrait photograph), a result, of using the present invention, can be a realistic portrait in the form of a bas-relief sculpture. A definition of bas-relief sculpture is as follows.

In general, a relief is an object that has been formed (from an item of source material called the "substrate") to communicate a visual composition to a viewer. A relief can be distinguished from many other forms of visual communication by the fact that it communicates its visual composition by having at least one "structural element" that is raised (or lowered) relative to a reference plane (also referred to herein as a 2D base). Z is the dimension along which a structural element is raised or lowered. The forming of such structural elements can be accomplished by any suitable technique or techniques, including (but not limited to) molding, bending, milling or carving.

A "structural element" is an element whose perception, by an ordinary viewer of the composition, is intended to be influenced by its having a third dimension. An "ordinary viewer" can be defined as a person who is within the normal range of human stature and has, with or without the use of visual aids, a normal level of visual acuity.

An advantage of a relief, compared with a 2D depiction, is that the Z dimension can add, through one or more structural elements, a heightened realism.

The present invention focuses on printing upon a relief, with inkjet technology, that is of the "bas" or "low" relief category. Formally, bas relief can be defined as follows. When a viewer views any point of the relief, along a line-of-sight perpendicular to the reference plane, such point is not blocked from view by any other surface point of the relief. Informally, this can be expressed by saying that the relief has no "overhang."

Figure 1B:
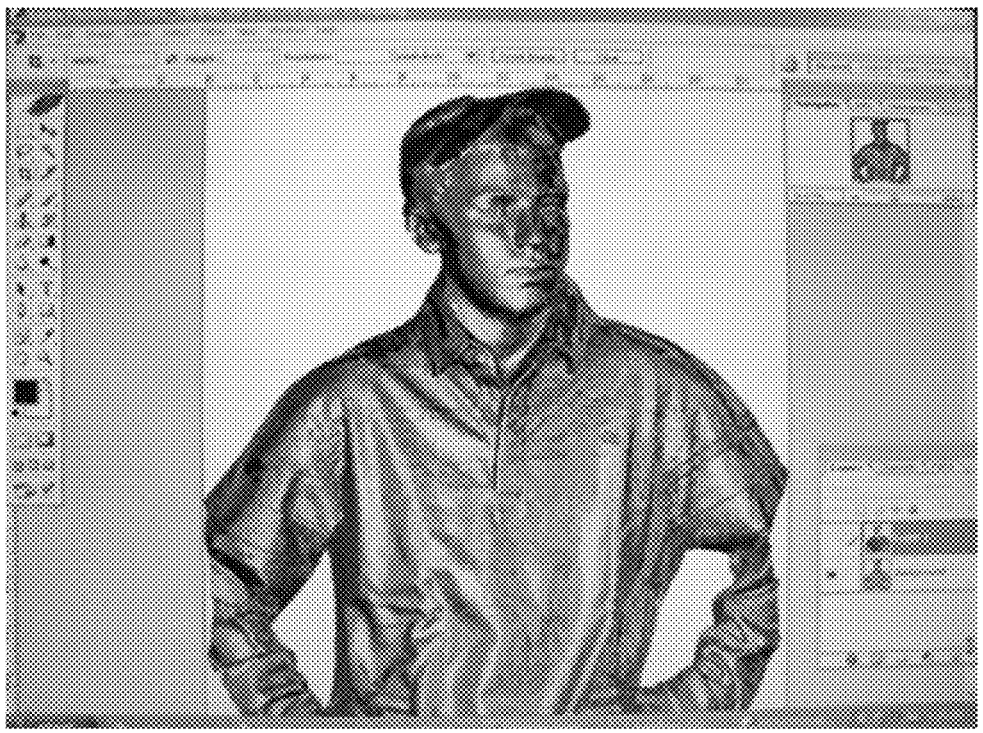
FIG. 1B shows the 2D image data of FIG. 1A being converted into a three-dimensional model.

FIG. 1A depicts an example of 2D image data, in the form of a portrait photograph (boy in baseball cap). In order to guide the production of a 3D substrate, FIG. 1B shows the 2D image data of FIG. 1A being converted into a three-dimensional model ("3D modal In FIG. 1C, a 3D substrate is shown, where the 3D substrate has been milled from a suitable material (e.g., High-Density Urethane or Expanded Polystyrene) according to the 3D model. FIG. 2A shows how the 3D substrate of FIG. 1C can be related to the above definition of 3D substrate. In particular, FIG. 2A shows the definition of a 2D base 210. With respect to this 2D base, that can be described with just the two axes X and Y, a Z dimension is introduced by showing an outline 220 along the top of the "face" of the portrait sculpture. FIG. 2B shows an abstraction of the 3D substrate introduced in FIG. 2A. As can be seen, FIG. 2B introduces a set of three axes labeled 200. Any location on 2D base 210 can be identified by just two of the three axes: X and Y. Further, any location on outline 220, which represents a portion of the surface of the 3D substrate, can be identified by introducing the "Z" third dimension. In particular, FIG. 2B shows a particular point, on outline 220, identified by the arrow 221. As can be seen, arrow 221 identifies the height of a particular point on the "forehead" of the "face" of the portrait sculpture.

Figure 1C:
FIG. 1C shows a 3D substrate that has been milled from a suitable material.
Figure 1E:
FIG. 1E is a picture of a finished bas-relief sculpture.
Figure 2A:
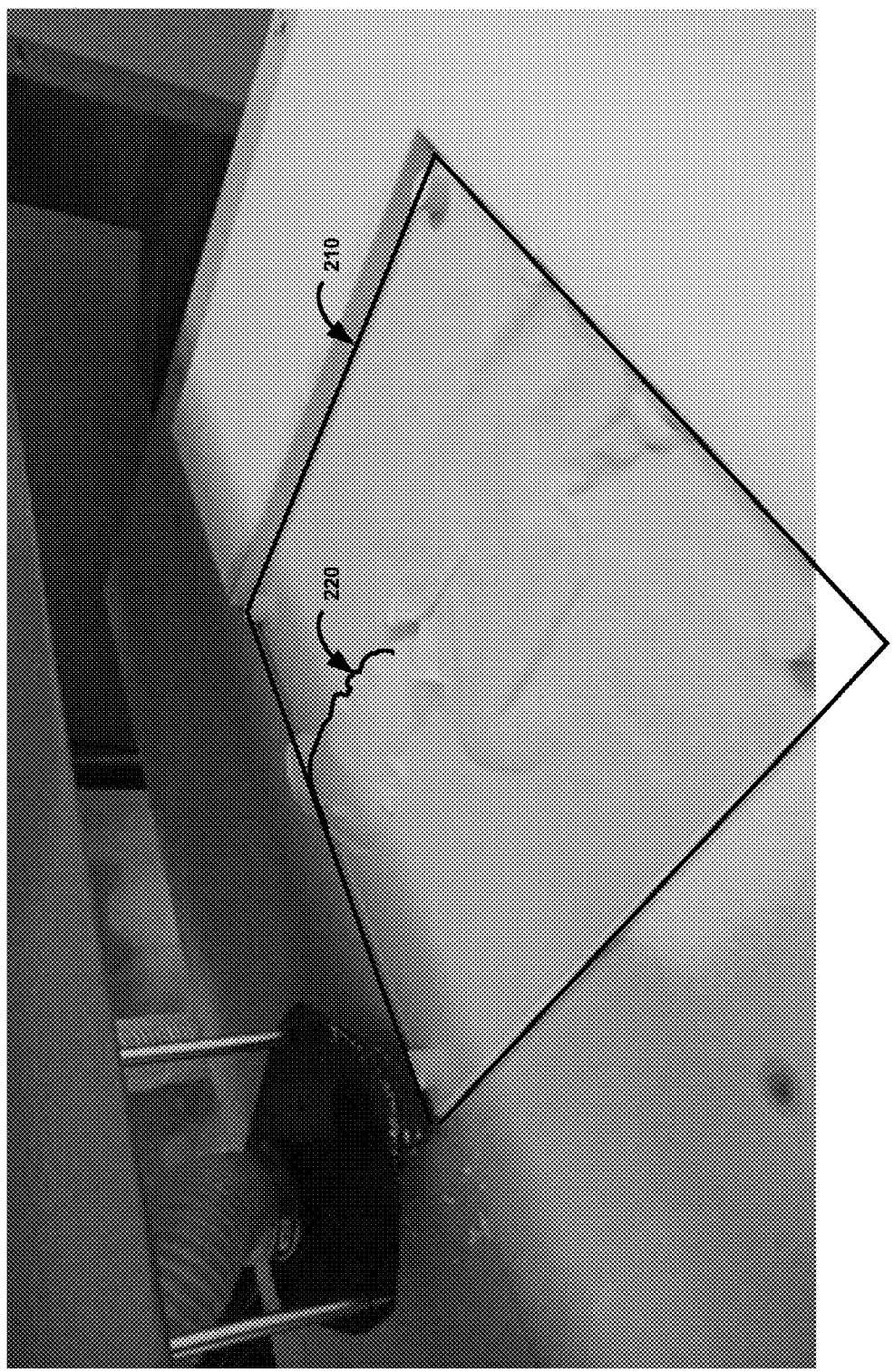
FIG. 2A shows how the 3D substrate of FIG. 1C can be related to a definition of 3D substrate.
Figure 2B:
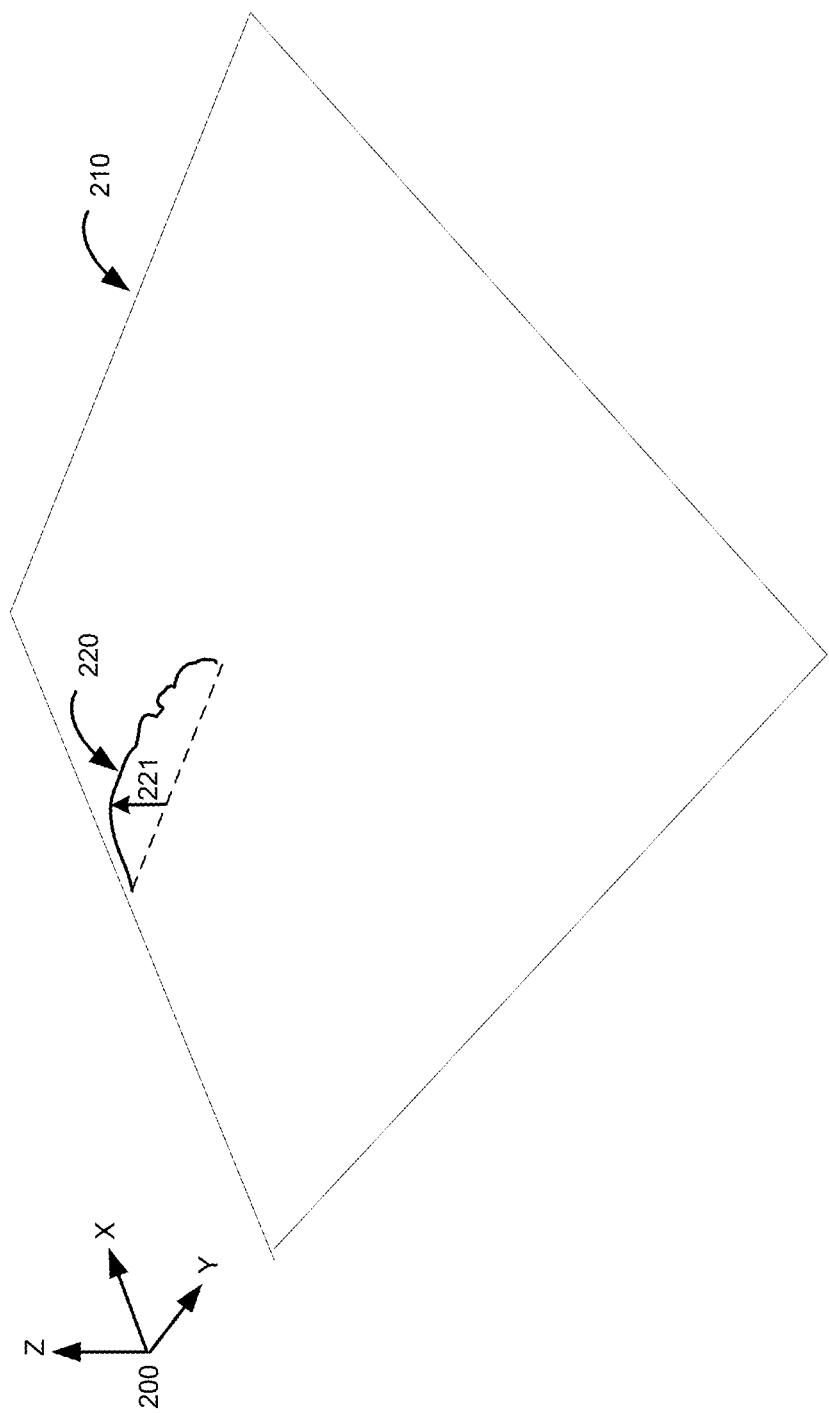
FIG. 2B shows an abstraction of the 3D substrate introduced in FIG. 2A.

Returning to consideration of the 3D substrate of FIG. 1C, it can be seen that such substrate has not yet been subjected to ink jet printing. In FIG. 1D, an ink jet printer, constructed in accordance with principles of the present invention, is shown depositing the 3D model of FIG. 1B upon the 3D substrate of FIG. 1C. FIG. 1E is a picture of the finished bas-relief sculpture, that is a realistic representation of the person shown by the two-dimensional image data of FIG. 1A. While the two-dimensional image data of FIG. 1A is shown monochromatically (i.e., in black and white only), one of ordinary skill will readily appreciate that the image can be in color. In that case, the 3D model of FIG. 1B can include such coloring and the printing, of FIG. 1D, can include the deposition of appropriately-colored ink to produce, for FIG. 1E, a bas-relief sculpture with realistic coloring.

As another example substrate pattern, consider a realistic three-dimensional computer model of the Parthenon Frieze, where period-appropriate coloring has been added by an appropriate computer "painting" tool. A result of using the present invention can be a three-dimensional reproduction of the Parthenon Frieze with the deposition of ink according to an historically-accurate coloring scheme.

In general, the production of a bas-relief sculpture, with 2D image data printed thereon, can be described as including the following steps (each of which is addressed in more detail below):

1. 3D modeling
2. substrate preparation
3. producing print data
4. printing substrate pattern on the substrate While the steps of 3D modeling, producing print data, and printing substrate pattern on the substrate should generally be performed in that order, the step of substrate preparation (that includes shaping the substrate and, possibly, treatment of the substrate surface) can be done at any time prior to the step of printing.

The maximum extent to which the Z dimension needs to vary with respect to the 2D base, in order to achieve an appropriate three-dimensional effect, can depend upon at least the following factors:

1. The size of the 3D substrate to be produced;
2. The viewing distance (i.e., the typical range of distances, from which a viewer is intended to observe the 3D substrate);
3. The subject matter to be conveyed by the 3D substrate; and
4. The communication objectives of the person or organization producing the 3D substrate.

In general, the smaller the finished 3D substrate is intended to be, the shorter the viewing distance and the less the Z dimension needs to vary to achieve a suitable three-dimensional effect. In the case of a small object (e.g., an object that is roughly in the size range of a cube, 9 cm per side), with a short viewing distance (e.g., 30-60 cm), a Z dimension that can vary by about 1 cm may provide a sufficient three-dimensional effect. For a larger object (such as a "life size" bas relief portrait), with a longer viewing distance (e.g., 1-2 meters), a Z dimension that can vary by about 2 cm may desired.

Using the techniques described herein, an amount of variation in the Z dimension that can be accommodated is, at least, approximately 4 cm.

It is interesting to note that the Parthenon Frieze, which is well over 100 meters in length and about 1 meter high, has a Z dimension that can vary by as much as about 5.6 cm.

Regarding the above-presented definition of 3D printing, it is important to note that the 2D base need not be flat (as in the classical Euclidian plane). For example, the 2D base 210 of FIG. 2B can have one or more curves. FIG. 2C shows a 2D base that is like 210, except it has been curved along one of its axes. More particularly, FIG. 2C shows a tubular shape 211 formed from the curving of 2D base 210. Even though such tubular substrate can still be described with a straight set of axes 200 (as shown in the upper-left of FIG. 2C), it can be more efficient to utilize a set of axes, such as the one labeled 202, that is curved along the X dimension. In this case, axes X, Y and Z of FIG. 2B correspond to axes X2, Y2 and Z2 of FIG. 2C. A same portion 220, of a same portrait sculpture "face," is shown projecting from the right side of tubular shape 211. As with FIG. 2B, an arrow 221 of FIG. 2C identifies the height of a particular point on the "forehead" of the "face" of the portrait sculpture.

It is important to note that other shapes, besides a tube, can be created by subjecting the X and/or Y dimensions, of a 2D base, to one or more curves. Other example shapes include (but are not limited to) the following: shapes where the 2D base (to at least some extent) closes upon itself (such as a sphere or toroid) and shapes where the 2D base does not close upon itself (such as a "saddle" shape).

2 Three-Dimensional Modeling

If 2D image data is to be printed on a 3D substrate, such that the substrate's third dimension works with and enhances the realism of the image data, it is advantageous to produce a three-dimensional model (or 3D model) of such image. Such 3D model can then serve as the substrate pattern for printing.

Any suitable three-dimensional modeling software can be used to produce a 3D model. An example of such software is "Mudbox," produced by Autodesk, Inc., San Rafael, Calif., U.S.A. There are inherent challenges in this process since, for example, the actual texture and/or shape of the subject material may not be obvious from the two-dimensional image. In such instances, texture and/or shape needs to be inferred. The inference can be accomplished under the guidance of a human operator, or suitable algorithms, that admit of a more automated process, can be used. Other challenges, in the production of a three-dimensional model, can include the following:

1. Avoiding the introduction of undercuts, or overhangs, that could obstruct the lay-down of ink.
2. Avoiding the introduction of slopes that are excessively steep, since they can result in an insufficiently dense lay-down of ink.

Alternatively, the substrate pattern can be originally produced as a three-dimensional model, thus skipping a 2D image to 3D model conversion step. Techniques for producing a 3D model include the following:

1. Using any suitable three-dimensional modeling software to produce an image that, while appearing three-dimensional, may be completely synthesized. Once again, an example of suitable software is Mudbox by Autodesk (cited above).
2. A real world object or scene is reproduced, as a 3D model, by a scanning process.

The software for 3D modeling (for either modeling of 2D image data or directly synthesizing a 3D model) can be executed on any suitable combination of software and hardware or by a suitable configuration of hardware alone. An example suitable combination of software and hardware is a general purpose computer executing software.

Figure 13:
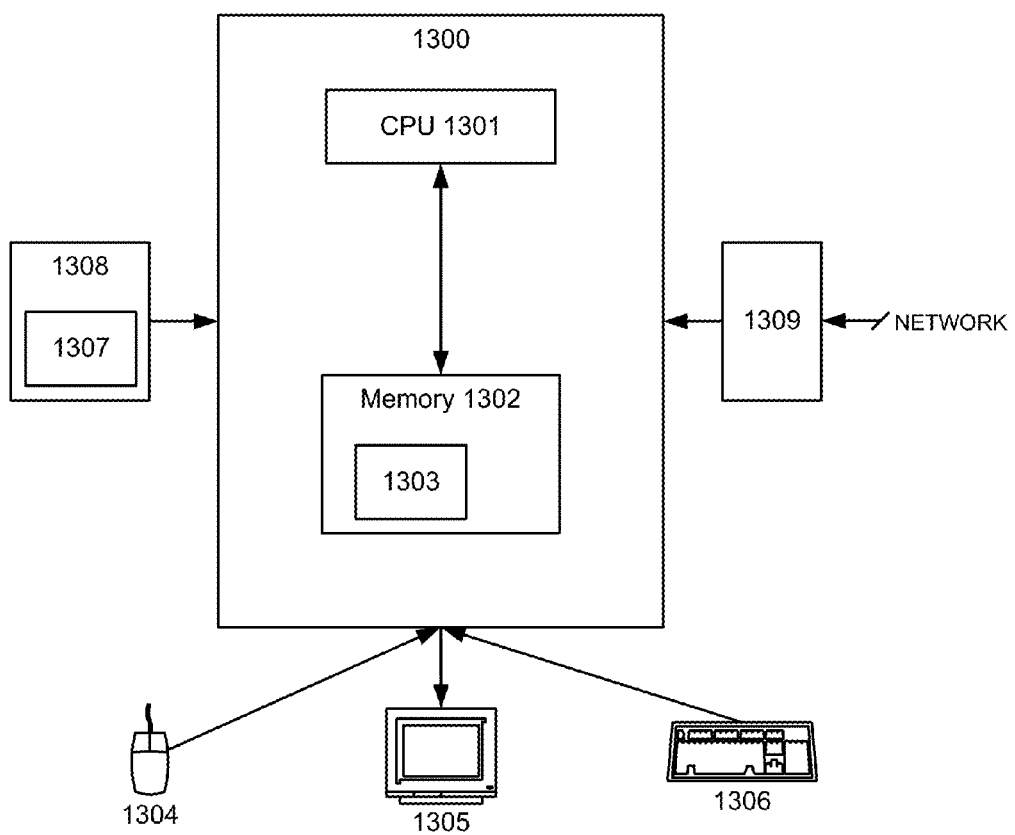
FIG. 13 shows an example general purpose computer.

An example general purpose computer is depicted in FIG. 13. FIG. 13 depicts a workstation computer 1300 comprising a Central Processing Unit (CPU) 1301 (or other appropriate processor or processors) and a memory 1302. Memory 1302 has a region 1303 in which is stored the relevant software (such as for 3D modeling or, as discussed below, for Raster Image Processing) and its data. While 1303 is depicted as a single region, those of ordinary skill in the art will appreciate that, in fact, such software may be distributed over several memory regions or several computers. Furthermore, depending upon the computer's memory organization (such as virtual memory), memory 1302 may comprise several types of memory (including cache, random access memory, hard disk and networked file server). Computer 1300 can be equipped with a display monitor 1305, a mouse pointing device 1304 and a keyboard 1306 to provide interactivity between the software and the user. Computer 1300 also includes a way of reading computer readable instructions from a computer readable medium 1307, via a medium reader 1308, into the memory 1302. Computer 1300 also includes a way of reading computer readable instructions via the Internet (or other network) through network interface 1309.

In some embodiments, computer programs embodying the present invention are stored in a computer readable medium, e.g. CD-ROM or DVD. In other embodiments, the computer programs are embodied in an electromagnetic carrier wave. For example, the electromagnetic carrier wave may include the programs being accessed over a network.

If display monitor 1305, mouse pointing device 1304, and keyboard 1306 are omitted, FIG. 13 can also be representative of an embedded computer system.

3 Substrate Preparation

3.1 Overview

However it is produced, the three-dimensional model can be used to produce a three-dimensional substrate. The 3D substrate can be made of any suitable material that is shaped or formed by any suitable technique. Factors that can effect the suitability of a material can include: the shaping or forming technique utilized, the type of substrate surface needed, and the end-use application of the 3D substrate once printing has been completed. Shaping techniques can include, but are not limited to: forming, molding, extruding, bending, milling or carving. An example of milling is to use the 3D model to guide a Computed Numerically Controlled (CNC) milling machine.

The CNC milling machine can carve the third dimension, of the three-dimensional model, from a solid piece of material with an initially uniform depth (or Z dimension). The material to be milled, for example, can be a High-Density Urethane (HDU) or Expanded Polystyrene. However, any material can be used, so long as it results in a surface that is sufficiently smooth and capable of accepting subsequent treatments.

For example, a coating can be applied, to the milled substrate, that serves any combination of the following purposes:
1. Produces a substrate with sufficient brightness, such that the colors of the printing process will be able to achieve a certain color gamut.
2. Provides a desired surface texture and/or appearance.
3. Makes the substrate chemically compatible with a printing process.

Each of these purposes is addressed in more detail in a following sub-section.

3.2 Brightness

An optically bright coating is important for achieving either, or both, of the following:
1. the maximum color lightness that the utilized inks are capable of producing;
2. providing the most accurate color reproduction.

3.3 Texture

The gloss level of the coating is an important factor in effecting the appearance of the final product of a three-dimensional printing process. The glossiness can approximate that of the printed and cured ink, to avoid gloss changes where the density of ink lay-down changes.

The method of application of the coating can also have significant influence on the appearance of the final product. Brushing, as opposed to spraying, can produce a particularly useful surface for either or both of the following reasons:
1. helps disguise printing artifacts that are inherent in a printing operation;
2. provides an appearance similar to a painted canvas.

In fact, the technique by which a coating is applied, can be more significant factor, effecting the final product, than the specific substrate and/or coating materials used.

3.4 Chemical Compatibility

Suitable inks, for printing upon an above-described substrate, include inkjet inks with the following characteristics:
1. UV radiation-curable,
2. pigment-based, and
3. contain mainly acrylate monomers and UV photoinitiators.

UV inks satisfying these characteristics have been shown to work well on polymeric materials and coatings. Provided the substrate surface is appropriate, however, inks of other chemistries can be used. Other kinds of inks can differ, for example, because they utilize: dyes, a water-base, latex, or phase-change.

In general, the surface energy of a substrate can effect its compatibility with an ink. For example, a low surface energy substrate can cause de-wetting that will result in image distortion and/or loss of detail. Conversely, a porous or fibrous surface may, through absorption or capillary action, distort image detail and effect color accuracy or intensity. There are ways to modify surface energy, including corona treatment.

4 Producing Print Data

However it is produced, a substrate pattern typically needs further processing, for purposes of printing it on a particular printer and on a particular substrate. Such further processing is herein called "prepress" and can be accomplished by what is called a Raster Image Processor (RIP). The output of the prepress process is herein called the "print data." The print data can then be utilized, by a printer, in order to achieve the actual printing of the substrate pattern on the 3D substrate.

A major function of the RIP is to convert a substrate pattern, where color and/or shading is encoded in continuous tone format, to patterns of dots (known as a halftone format). Continuous tone format is typical for substrate patterns that are displayed on a typical computer screen. Continuous tone formats are characterized by allocating a certain number of bits per pixel. For example, a continuous-tone grey-scale image, that encodes a monochromatic gradient, may allocate 8 bits per pixel, admitting of 256 levels over the range of black to white. As another example, a continuous tone color image may allocate 24 bits per pixel, with 8 bits for each of Red, Green, and Blue (also known as RGB additive color encoding).

A halftone approach, to displaying a continuous-tone grey-scale image on a 2D substrate, is as follows. The print data can just be representative of a grid of locations, at an appropriate spacing, where each grid location is represented by a single bit of data. For each bit, one value indicates no drop is to be placed (at its grid location) while the other value indicates a drop is to be printed. FIG. 11A, for example, shows a grid with 4 columns (C0-C3) and 4 rows (R0-R3), within which are 16 locations where a droplet can be placed. If the printer has a resolution of 600 dots-per-inch (dpi), then each row is spaced $\frac{1}{600}$ of an inch apart from any adjacent rows and each column is spaced $\frac{1}{600}$ of an inch apart from any adjacent columns. The state of the grid of FIG. 11A, for purposes of halftone printing, can be represented by allocating just one bit per grid location, for a total of 16 bits.

FIG. 11B shows the same grid as FIG. 11A, except that a dot is located on all the grid locations of rows R1-R2, forming a black horizontal line that is parallel to the X axis. To form a horizontal line of useful length, at 600 dpi, requires much more than just a row of 4 dots. For example, simply to have a line of length $\frac{1}{10}$ inch requires 60 pixels in a row.

Figure 11D:
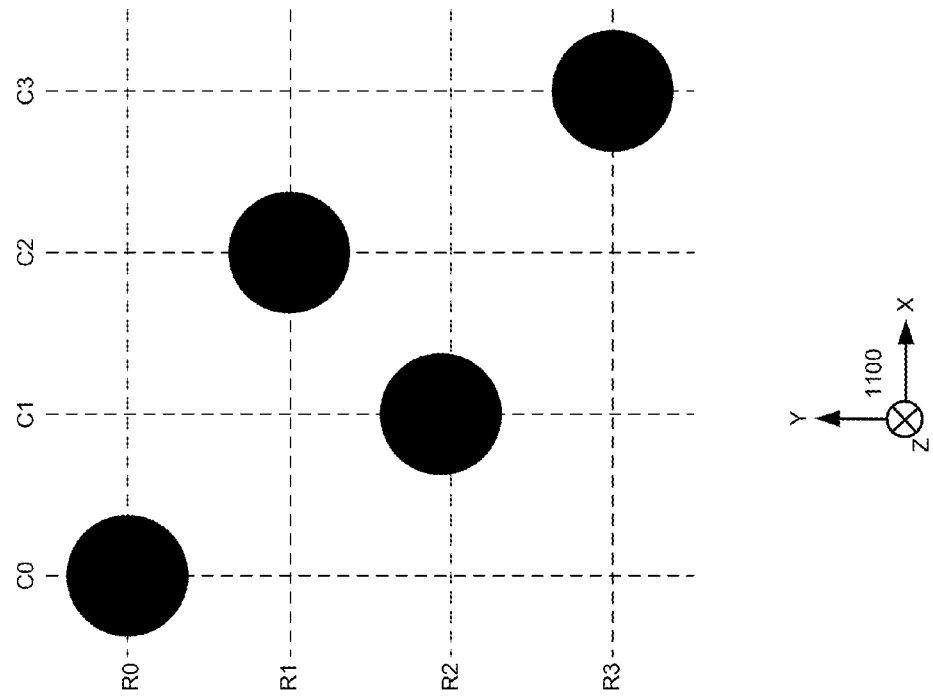
FIG. 11D shows a dot distribution for producing a grey with a tone of 25%.
Figure 11C:
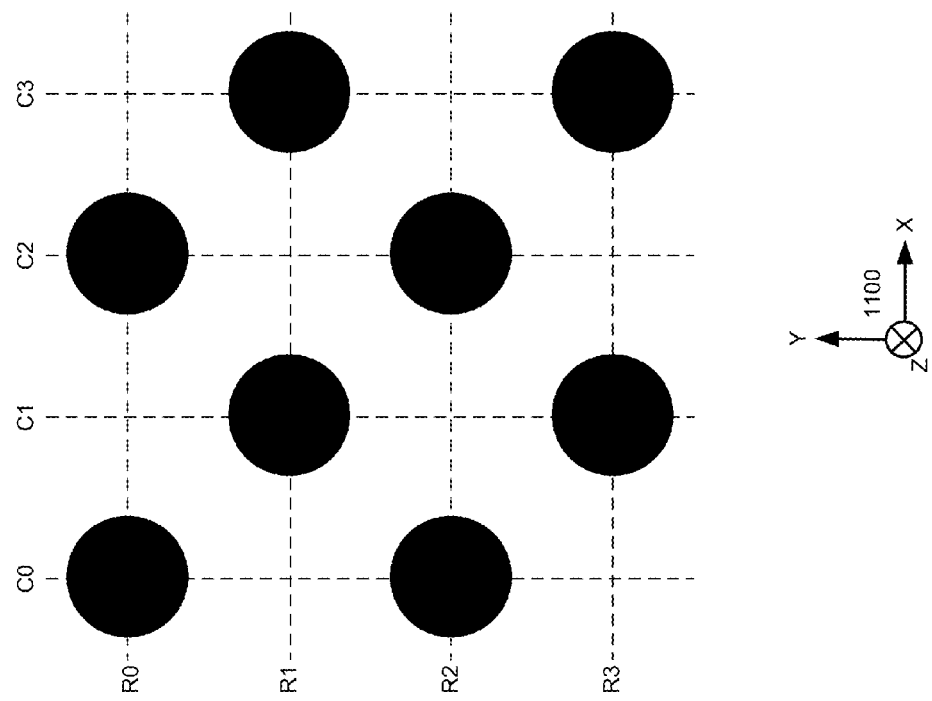
FIG. 11C shows a dot distribution by which to produce a grey with a tone of 50%.

While FIG. 11A represents pure white, FIG. 11C shows a dot distribution by which to produce a grey with a tone of 50% (because ½, of the 16 locations, are black) while FIG. 11D shows a dot distribution for producing a grey with a tone of 25% (because ¼, of the 16 locations, are black). These are only example distributions and anyone of ordinary skill in the art of halftone image encoding will know that many other placements of the dots can be used. The perception of a grey with a particular level of tonality is only produced, of course, over much larger numbers of grid locations than the 16 shown. For example, just to produce a certain level of grey over an area $\frac{1}{10}$ inch square, requires the controlling of a 60×60 grid, or 3600 grid locations (represented by 3600 bits).

A halftone approach, to displaying a continuous-tone color image on a 2D substrate, is as follows. First, an appropriate color-encoding technique must be selected. The most common is the subtractive color encoding technique that uses the colors Cyan, Magenta and Yellow (or CMY). Each of these colors can be represented by a separate grid. Each of these grids is essentially identical to that described above, for halftone encoding of continuous tone grey scale images, except that each bit represents the presence or absence, at a grid location, of the color represented by the grid.

Figure 12B:
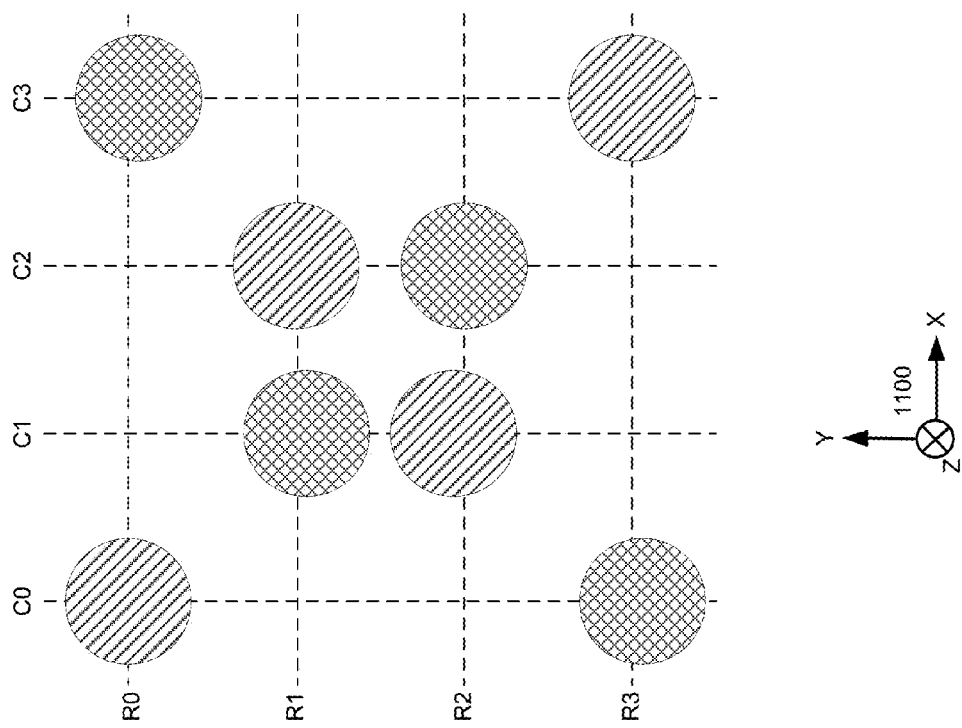
FIG. 12B depicts an example distribution by which to produce a red with a tone of 25%.
Figure 12A:
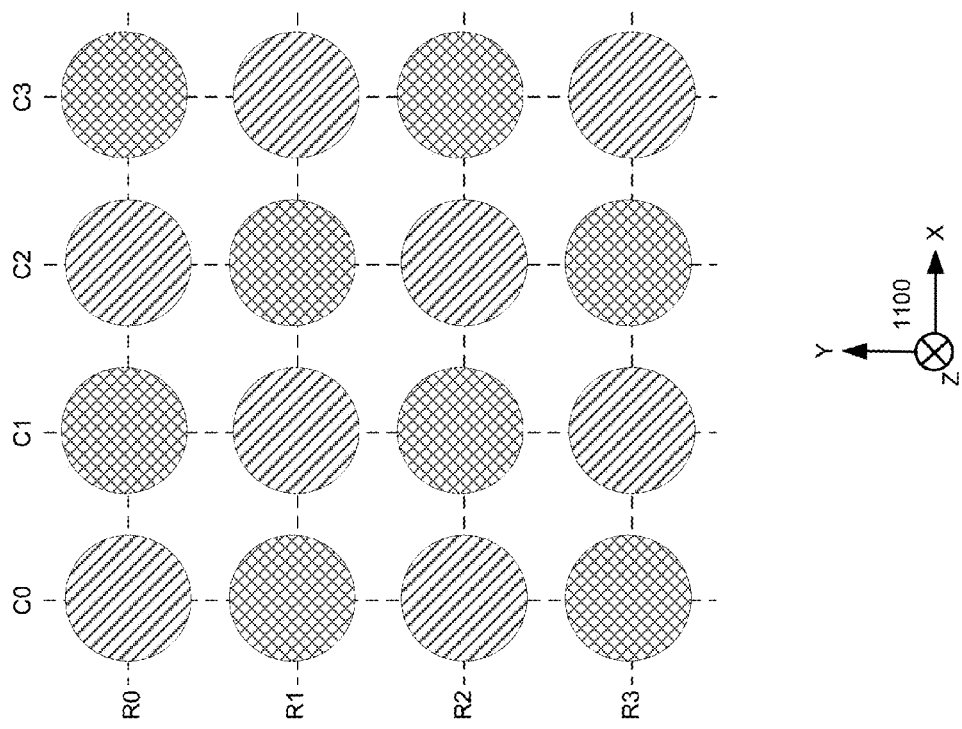
FIG. 12A depicts an example distribution by which to produce a red with a tone of 50%.

FIG. 12A, for example, depicts a distribution by which to produce a red with a tone of 50%, if the dots with one type of cross-hatching represent Magenta and the dots with the other type of cross-hatching represent Yellow. As can be seen, each type of cross hatching occupies ½ of the 16 grid locations. In a similar manner, FIG. 12B depicts a distribution by which to produce a red with a tone of 25%, since each type of cross hatching occupies ¼ of the 16 grid locations. These are only example distributions and anyone of ordinary skill in the art of halftone image encoding will know that many other placements, of the Magenta and Yellow dots, can be used.

Two differences, between the grids of FIGS. 11-12, and an actual print result on a 2D substrate, include the following:
1. The dots formed by droplets are generally not perfectly centered on the grid points, due to a variety of errors.
2. The dots formed by droplets are generally larger. Usually, the dots are large enough such that they have some overlap with dots on adjacent grid locations. Smaller dots are shown herein for purposes of clarity.

To provide further control in the halftoning process, over the tone of the grey or color produced, some halftoning processes (referred to herein as "grey-scale halftoning") utilize multiple size droplets. Thus, in addition to deciding whether a drop is present or not at a particular grid location, grey-scale halftoning provides the option of placing a drop that can be one of a selection of predefined sizes. In conventional 2D grey-scale halftoning, each drop size is produced by a single drive pulse. In the next section (Section 5 "Printing"), this is contrasted with 3D printing, where multiple drive pulses may be used for the production of just one drop.

In addition to conversion between color-encoding schemes, an RIP can perform local compensations, within the print data, in order to further improve the appearance of the substrate pattern as it appears on a 3D substrate. Such compensations (for errors defined below as "slope error," "dynamic error" and "dynamic slope error") are discussed below in the section on printing.

Other standard operations performed by the RIP include sizing and/or rotating the substrate pattern, which can be necessary to match the pattern to the physical substrate.

The operations of the RIP can be executed on any suitable combination of software and hardware or by a suitable configuration of hardware alone. Example suitable combinations of software and hardware include the following: a general purpose computer executing software, an embedded computer executing software and/or firmware.

5 Printing 5.1 Overview

This section addresses the apparatus and methods by which the print data can be actually printed, on the 3D substrate, with a digital inkjet printer. An example printer is the wide-format GandInnovations, Agfa Jeti, Model 3150 (GandInnovations is located in Mississauga, Ontario, Canada). It has a moving table capable of supporting up to 3 meter (or "m") by 1.5 m rigid substrates.

An example generic digital inkjet printer 301 is shown in FIG. 3A and is described with respect to a set of three axes (X, Y, and Z) that are identified, collectively, by numeral 300. The printer is comprised of a printhead carriage 310. X-axis motion of carriage 310, relative to a substrate 320, is achieved by moving it along carriage guide 312. Y-axis motion of carriage 310, relative to a substrate 320, is achieved by moving table 311. Table 311 and guide 312 are supported by a main structural support surface 313.

Figure 3B:
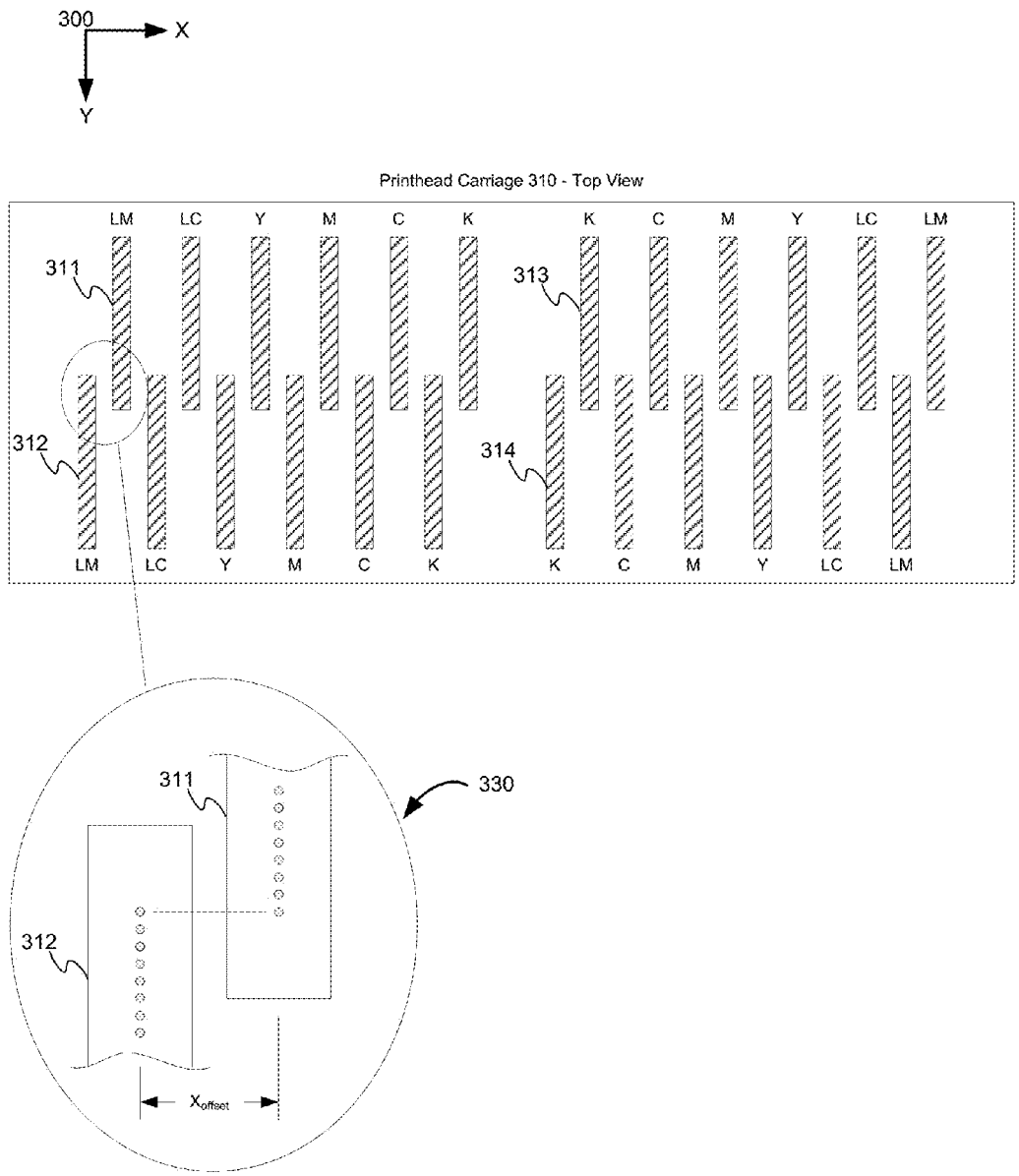
FIG. 3B is a detail of just a printhead carriage from a top view.

FIG. 3B is a detail of just printhead carriage 310, from a top view. The X and Y axes, of set of axes 300 of FIG. 3A, are shown in their corresponding position in FIG. 3B. FIG. 3B shows printhead carriage 310 as containing 24 ink jet printheads. Each printhead is assumed to print a single color via a single column of nozzles. The printhead are arranged in 12 pairs, the two printheads of each pair lying along the Y dimension, printing a same color, and are slightly out-of-line with each other. For example, printheads 311 and 312 form a pair that prints the color Light Magenta (or LM).

Overall, it can be seen that printhead carriage 310 prints color according to the subtractive CMY (Cyan-Magenta-Yellow) color-encoding scheme. As is typical of CMY printing, black is produced by a printhead with black ink (where black is represented as "K"). In addition, to provide a finer range of colors, while still staying within the halftone scheme discussed above in Section 4 ("Producing Print Data"), the colors LM (Light Magenta) and LC (Light Cyan) are also provided.

As a means of increasing printing speed, two separate sets, each containing 6 pairs of printheads, are provided in printhead carriage 310. The first set of 6 pairs, from left to right, prints the following colors: LM (pair of printheads 311 and 312), LC, Y, M, C, K. The second set of 6 pairs, from left to right, prints the following colors: K (pair of printheads 313 and 314), C, M, Y, LC, and LM.

Typically, printer 301 covers a substrate 320 by printing in bands, as carriage 310 moves (or "scans") along the X direction. The width of each band depends upon the number of nozzles along the Y dimension of carriage 310. The printheads are arranged in pairs, in printhead carriage 310, to increase the width of that band. The printheads of a pair are not exactly in-line with each other (i.e., their nozzles do not follow the same exact location on the Y axis) because the nozzles of a printhead do not typically extend to the edge.

Detailed view 330, of FIG. 3B, shows how offsetting a pair of printheads allows them to act like one long column of nozzles along the Y axis (with X fixed). Specifically, for each of pair of printheads, the last nozzle of the upper printhead (e.g., printhead 311) is made to overlap with the first nozzle of the lower printhead (e.g., printhead 312). This technique is called "stitching." The amount of the offset, necessary to achieve stitching, is represented as $X_{offset}$. The timing of the firing, of the printheads of each pair of printheads, is controlled so that, for a particular column of data at a fixed value for X, both fire dots at the same X position of the substrate, creating the effect of a single continuous column of nozzles.

When stitching is used, the redundant nozzles can be made to alternate between which one provides the next drop along a row (i.e., a fixed Y) in the printed substrate pattern. Stitching helps overcome any alignment errors and produce a more uniform blending of the printing from multiple heads of a column.

After printer 301 has produced a band, the next band is created by moving the substrate 320 along the Y (or "step") direction by moving table 311. The next band can then be printed in one of two ways:
1. Reverse the direction of travel, of printhead carriage 310, along the X direction.
2. Print the next band by moving printhead carriage 310 along the same direction as was used for the previous band.

Approach 1, of reversing direction, has the advantage of speeding the printing process, relative to approach 2, since printing of the next band does not have to wait for printhead carriage 310 to return to its starting position. However, approach 1 cannot generally be used unless control of the printheads is adjusted to compensate for the difference in direction. This is because the change in direction introduces an error, for 2D printing, herein called "dynamic error." For 3D printing, dynamic error becomes even more complex, because of the potential for sloped surfaces, and is herein called "dynamic slope error." Both dynamic error and slope error are discussed below.

FIG. 4 depicts an example ink jet printer 401 very similar to that depicted in FIG. 3A. Following are some of the correspondences:
Printhead carriages 310 and 410;
Main support surfaces 313 and 413;
X motion guide 312 and 412;
Y motion table 311 and 411;
Sets of axes 300 and 400; and
Substrates 320 and 420.

The main difference, between the figures, is that substrate 320 for printer 301 has a non-varying Z dimension while substrate 420 for printer 401 has been shaped to represent a face. Face-shaped substrate 420 is intended to be similar to the face-shaped substrate discussed above with respect to the following FIGS.: 1C, 1D, 2A, and 2B.

Figure 5A:
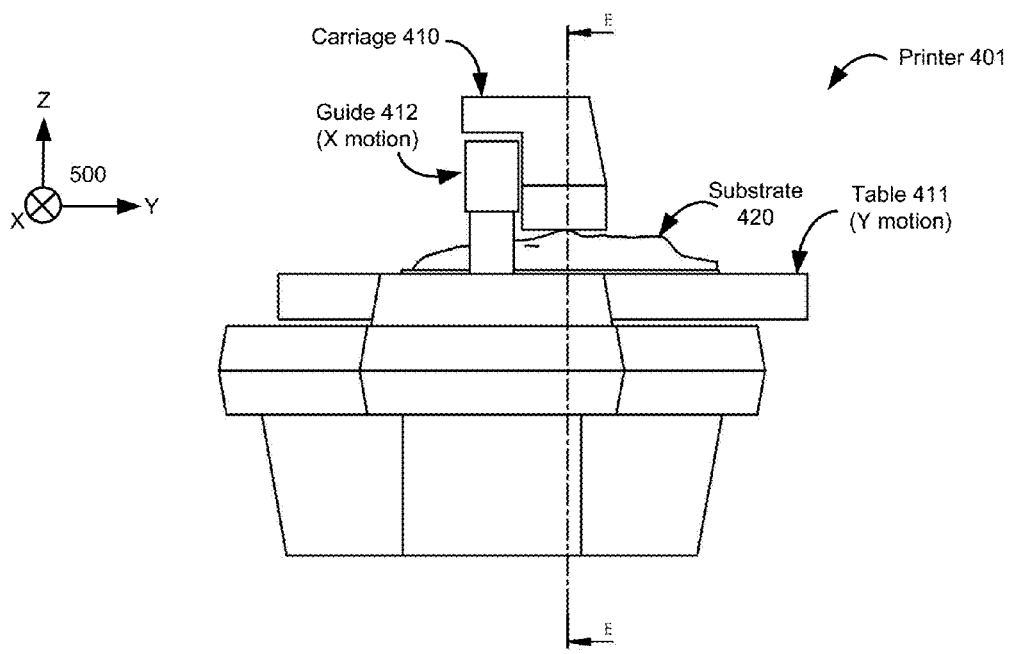
FIG. 5A shows the same printer as depicted in FIG. 4, except seen from a side view and with a cut-plane E-E.
Figure 5B:
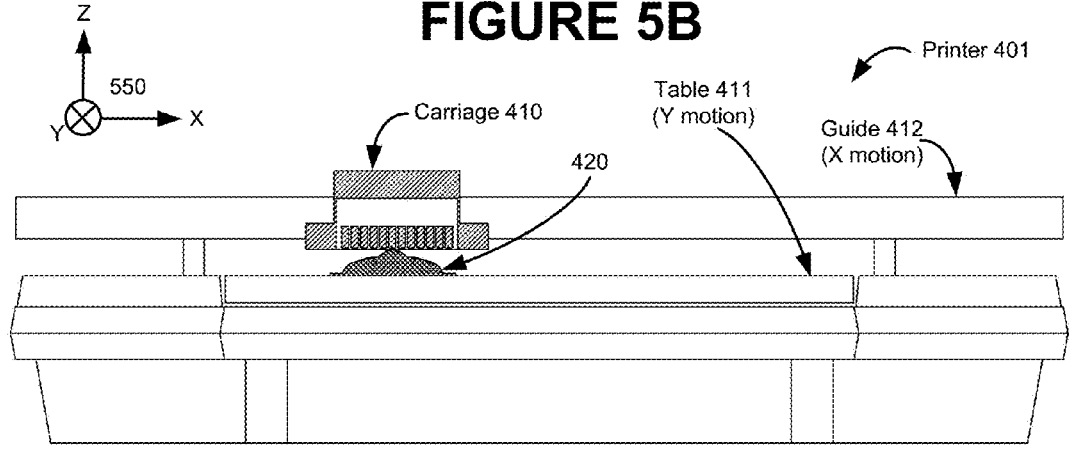
FIG. 5B shows half of the printer of FIG. 5A, graphically cut by cut-plane E-E.

An example printing process, by which printer 401 can print upon substrate 420, is further illustrated in FIGS. 5A-5B and 6A-6B. FIG. 5A shows the same printer 401 as depicted in FIG. 4, except that in FIG. 5A it is seen from a side view. The orientation of the side view of FIG. 5A, with respect to FIG. 4, can be understood by a comparison of the sets of axes 400 and 500. FIG. 5A also shows a "cut-plane" E-E that is parallel to the X and Z axes, of set of axes 500. Graphically, cut-plane E-E "cuts" printer 401 in half, and only the half with X motion guide 412 is shown in FIG. 5B. With respect to FIG. 5A, the half shown in FIG. 5B has been rotated clockwise, by 90 degrees, about the Z axis. FIG. 5A shows that face-shaped substrate 420 is cut, by cut-plane E-E, through the tip of the substrate's "nose." FIG. 5B shows the resulting substrate profile, along the Z dimension, once substrate 420 has been cut. Profile 420 of FIG. 5B shows the "landscape" to be printed, by a single row of printhead nozzles (i.e., the nozzles for a fixed Y), as printhead carriage 410 moves along the X axis.

Figure 6A:
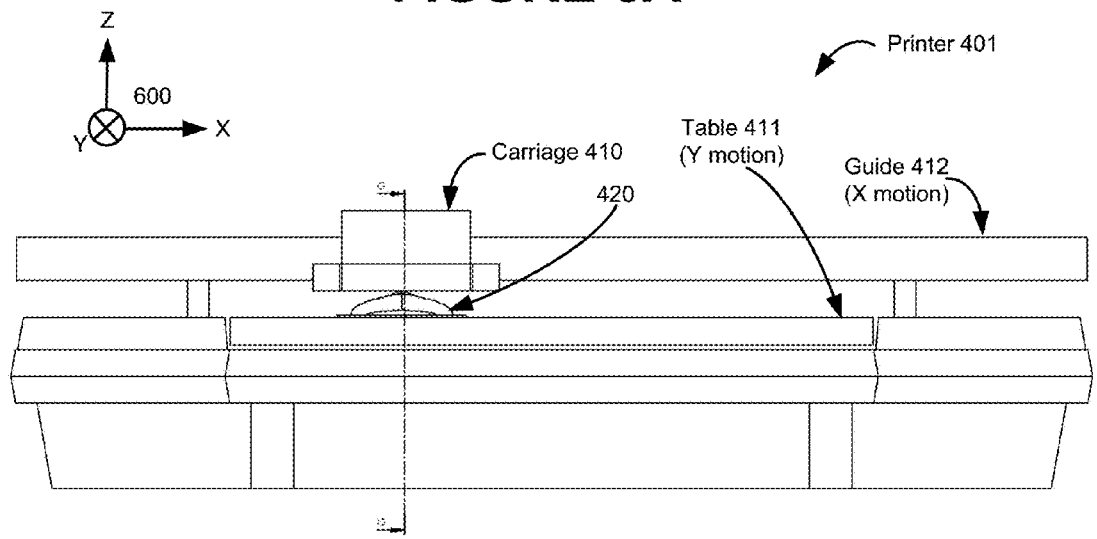
FIG. 6A shows the same printer as depicted in FIG. 4, except seen from a side view and with a cut-plane G-G.
Figure 6B:
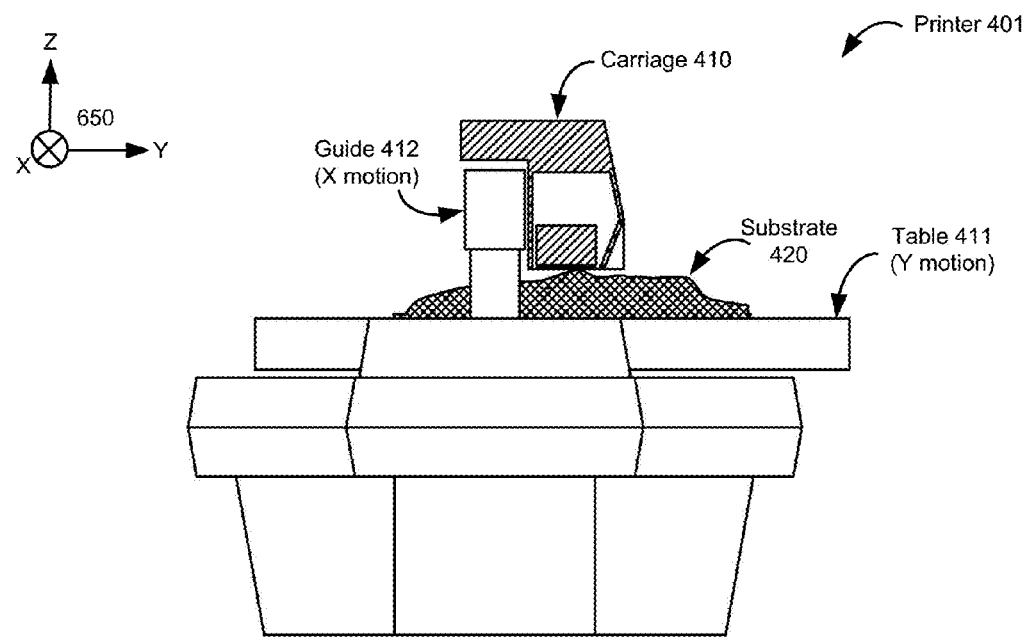
FIG. 6B shows half of the printer of FIG. 6A, graphically cut by cut-plane G-G.

In a manner similar to FIGS. 5A-5B, FIGS. 6A-6B show the same printer 401 as depicted in FIG. 4, except that it is seen from two different views. The orientation of the side view of FIG. 6A, with respect to FIG. 4, can be understood by a comparison of the sets of axes 400 and 600. As with FIG. 5A, FIG. 6A also shows a "cut-plane," but in FIG. 6A the cut-plane is labeled G-G and it is parallel to the Y and Z axes, of set of axes 600. Graphically, cut-plane G-G "cuts" printer 401 in half, and either one of those halves is shown in FIG. 6B. For example, if we assume the left half of FIG. 6A is shown in FIG. 6B, then such halve has been rotated (for purposes of depiction in FIG. 6B) clockwise, by 90 degrees, about the Z axis. FIG. 6A shows that face-shaped substrate 420 is cut, by cut-plane G-G, through the tip of the substrate's "nose." FIG. 6B then shows the resulting substrate profile, along the Z dimension, once substrate 420 has been cut. Profile 420 of FIG. 6B shows the "landscape" to be printed, by a single column of printhead nozzles (i.e., the nozzles for a fixed X), as a result of table 411 making stepwise motions along the Y axis.

5.2 Conventional

This section addresses droplet generation and sources of error for conventional 2D digital inkjet printing. As is discussed further in following sections, these sources of error only become more important, when applied to the three-dimensional printing situation.

FIG. 8A presents a simplified illustration of conventional 2D digital inkjet printing, where only one nozzle 810 is shown as ejecting droplets towards a substrate 820. The "jetting distance" (the distance from the surface of the substrate to the nozzle plane) is indicated as $X_{JET}$ and is normally set as low as possible to minimize various printing artifacts.

Droplets are ejected (or not ejected) according to a fixed spacing, when measured according to the X or Y axis. This situation is illustrated in FIG. 8A, where a printhead nozzle 810 is shown moving from left to right, across substrate 820, with velocity $v_{scan}$. Over the distance indicated as $\Delta X_{LR1}$, it can be seen that nozzle 810 has ejected four droplets towards the surface of substrate 820. The droplets are shown as emerging from the nozzle with velocity $v_{drop}$.

As droplets are ejected from a nozzle, it is desired that they exhibit uniformity in at least the three following characteristics: size, shape, and trajectory. Uniformity in size and shape can be further described as follows: given a particular drive pulse, applied to a printhead's nozzle, it is desired that the drop produced be of predictable size and shape. Desired nozzle trajectory can be further characterized as follows: the printhead "shoots" (or ejects) droplets (i.e., imparts kinetic energy to droplets) such that they move along a straight-line trajectory that is orthogonal to the nozzle plane. Causes of deviation, from desired nozzle trajectory, can be referred to as trajectory (or "straightness") errors.

Various factors in the ink, printhead, and surrounding air introduce deviations from the above-described desired characteristics. For example, limitations on the tolerances, of the original printhead as it was manufactured, can effect the uniformity of all three of the above-listed characteristics. Such errors can increase during usage. For instance, usage of a printhead can lead to the accumulation of debris (such as excess ink) that partially obscures one or more nozzles.

Other important issues are air resistance and air currents. As an ink droplet travels, from nozzle to substrate, it can be slowed by air resistance. Once the velocity of the droplet has been sufficiently reduced, air currents can redirect it and/or cause it to break-up into "satellite" sub-droplets. In extreme cases, droplets can slow to the point where they assume velocities mostly determined by air currents, and may never even impact the substrate.

A particularly important type of straightness error, referred to herein as "dynamic error," is caused by the velocity of the printhead carriage (the $v_{scan}$ introduced above) as it scans along the X axis. Combined with jetting distance and droplet velocity ($v_{drop}$), $v_{scan}$ produces an error in position of the actual droplet impact location, with respect to the location that would be impacted if the printhead carriage were stationary.

Typical $v_{drop}$ is 6-8 m/s (meters/second), while typical $v_{scan}$ is less than 2 m/s. Despite the fact that the initial droplet velocity is three or four times the carriage velocity, droplets typically undergo considerable deceleration (due to air resistance) after leaving the nozzle. As an example of how large dynamic error can be, for a standard fixed jetting distance of approximately 1 mm (millimeter), as is often used in 2D printing, the result is typically a dynamic error of approximately 1 mm.

If droplets are only ejected while the printhead carriage travels in one direction (or unidirectional printing), all droplets are shifted by a nearly equal amount, with the net effect that, in 2D printing, the image appears accurate. Printing in both directions of printhead carriage travel (or bidirectional printing) is desirable, however, since it increases print speed (because the printhead is not idle while the carriage returns to the next start position). For bi-directional 2D printing, the dynamic error is doubled, since it operates in the opposite direction for each direction of printhead carriage travel. The net result can be a double-image effect.

FIG. 9A illustrates dynamic error for 2D unidirectional printing. In this case (unlike the slope error that is discussed below), $v_{scan}$ is considered when a droplet is ejected by nozzle 910 towards a substrate 920. Rather than the droplet impacting at location 930, the combination of $v_{scan}$ with $v_{drop}$ produces a rightward trajectory and impact at location 931. FIG. 9B illustrates dynamic error for 2D bidirectional printing. In this case, in addition to the situation of FIG. 9A, a droplet also needs to impact the same location (with respect to the Y axis) on the return trip of the printhead carriage. This return trip is represented in FIG. 9B by a nozzle 911 traveling at a velocity $-v_{scan}$.

A common technique, in printer software, for compensating for dynamic error in 2D bidirectional printing is as follows. The left to right and right to left dynamic errors are estimated, respectively, $\Delta X_{LR}$ and $\Delta X_{RL}$. Based on $v_{scan}$, the time it would take for the printhead carriage to traverse the distance of $\Delta X_{LR}+\Delta X_{RL}$ is estimated (referred to herein as $t_{dynamic}$). The drive pulses, for left to right printhead travel, are adjusted to end at $t_{dynamic}$ seconds before the printhead carriage reaches the end of its left-to-right travel. During right-to-left printhead travel, the drive pulses are adjusted to begin before the printhead has had a chance to move from its rightmost position.

5.3 3D Printing

As can be appreciated from the above discussion of droplet generation, two main parameters that can be controlled in ink jet printer design, in order to keep nozzle trajectory errors within acceptable limits, are the reduction of jetting distance and/or the increase of droplet size.

With conventional ink jet printing, however, the common desire by customers for ever greater print resolution has produced an industry trend towards printers that utilize ever smaller drop sizes. To compensate for the greater trajectory error introduced by smaller droplets, designers, of conventional ink jet printers, have introduced printers with ever shorter jetting distances. At present, the conventional jetting distance is typically within the range of 0.1 cm to 0.3 cm. Beyond this range, image quality deteriorates rapidly.

With the present approach to 3D printing, however, the ability to handle relatively large jetting distances is essential. This is because the maximum Z dimension, of a 3D substrate to be printed, is generally limited by the jetting distance. While it is possible to accommodate large Z dimensions by moving the printheads such that they track the 3D substrate's contour, in order to achieve acceptable print speeds, it is usually necessary for the printhead carriage (such as printhead carriage 410) to be large, with respect to the size of a relief's structural elements, and thus the ability to track a contour is limited. For certain applications, a combination, of some contour tracking by the printhead carriage (according to a 3D model of the substrate) with the ability to handle large jetting distances, can produce a most effective 3D printer design.

5.3.1 Drop Integrity

The present invention is focused on accommodating jetting distances of at least 1 cm and the techniques presented herein can handle jetting distances of at least 4 cm.

At these jetting distances, aside from slope and dynamic slope errors (addressed below), the main challenge is the maintenance of drop integrity. In developing the present invention, it was discovered that larger droplets (presumably due to their greater inertia) tend to fly straighter and farther than smaller droplets, given equivalent surroundings. Also, decreasing the velocity ($v_{scan}$) of the printhead carriage (along with a concomitant reduction in the frequency at which drive pulses are provided to the printheads) has been found to increase, for a given drop size, the jetting distance that can be accurately traversed. Observational phenomena, evidencing such improved jetting integrity, include the following: increased ink density (indicating that more ink is arriving at the substrate surface) and improved detail (indicating improved straightness in the droplets' trajectories). An example suitable printhead (referred to herein as "SL-128"), experimented with in producing the present invention, has a single row of 128 nozzles and is designed to fire a native 80 picoliter (or "pL") drop (or "droplet"). The SL-128 is produced, for example, by FujiFilm Dimatix, Inc., Santa Clara, Calif., U.S.A.

Even with printheads that produce 80 pL drops, the largest class of drop size known to be currently available in the industry, the drop cannot travel jetting distances of 2 cm (or more) without significant degradation. One solution is to manufacture printheads, specialized for 3D printing, that produce larger drop sizes. At present, however, larger drop sizes have been produced with such 80 pL/drop printheads by changing the electrical firing pulse used to drive the printheads.

Conventional digital inkjet printing employs a single firing pulse per droplet produced. This is intended to produce a consistent drop mass, commonly known as a binary or fixed drop size. For three-dimensional printing, however, it has been determined that multiple pulses can be used to achieve larger drop sizes. For example, a printhead designed to produce 80 pL/drop with a conventional single pulse, can be made to produce drops in the range of 120 pL to 200 pL. Experimentally, drops of about 160 pL have been found to provide good results with jetting distances of up to 3.5 cm.

Figure 7:
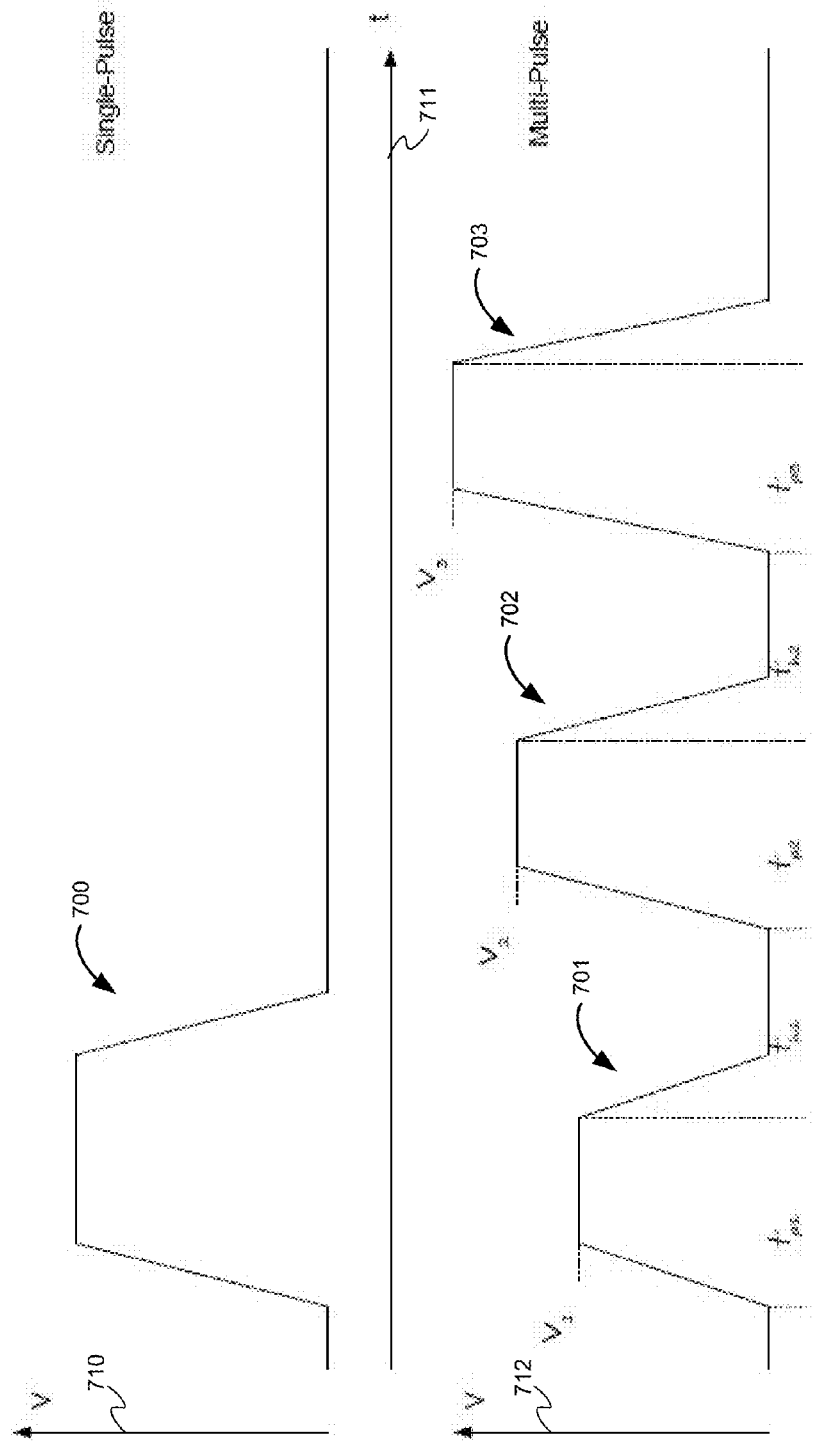
FIG. 7 shows a conventional single-pulse waveform and a multi-pulse waveform.

FIG. 7 shows a conventional single-pulse waveform 700, plotted against a voltage axis 710 and time axis 711. FIG. 7 also shows a multi-pulse waveform, comprised of pulses 701, 702, and 703 (all of which are plotted against a voltage axis 712 and time axis 711). What is essentially happening, for the multi-pulse waveform of FIG. 7, is as follows. On each of pulses 701, 702, and 703 a separate droplet is ejected from the nozzle. The increasing voltages of the three pulses help to ensure, however, that each new droplet has a higher velocity than the prior droplet. Because of the increasing velocity, the two later droplets catch-up to the first droplet and all three droplets join in mid-air. Various parameters of the multi-pulse waveform, including pulse amplitudes and delays, allow modification to the drop formation, and are tuned to the ink and printheads used in the system. This tuning can be done with a piece of test equipment that is known (in the inkjet printing industry) as a drop-watcher. A drop-watcher is capable capturing the images of the droplets as they are ejected, in real-time, from the printhead nozzles.

When used to drive an SL-128, pulses 701, 702, and 703 can produce, respectively, droplets of the following size (in pL): 80, 50, and 30. These can combine in mid-air to produce a single drop of about 160 pL that actually impacts the substrate's surface.

The types of characteristic waveforms, that can be used to determine the dimensions (both in voltage and temporally) for drive pulses like 701, 702, and 703, include the following:
dependence of drop velocity on the frequency of the drive pulses
dependence of drop velocity on voltage of drive pulse
dependence of drop mass on voltage of drive pulse
dependence of drop velocity on voltage of drive pulse width
dependence of drop mass on voltage of drive pulse width This use of multiple drive pulses, to produce a single larger ink drop, can be contrasted with conventional 2D grey-scale halftoning (discussed above with respect to the RIP) where only one drive pulse is used to produce each droplet. However, it should be noted that, in the printing of a halftone image on a 3D substrate, it is still possible to print drops that are selected from a plurality of drop sizes. For example, if it is desirable to have 3 drop sizes available, they can be produced as follows (from smallest to largest): one drive pulse (to produce, for example, a single drop of approximately 80 pL for impact upon the substrate surface), two drive pulses (to produce, for example, a single drop of approximately 130 pL for impact upon the substrate surface) and three drive pulses (to produce, for example, a single drop of approximately 160 pL for impact upon the substrate surface).

Even after droplets of sufficient size have been produced, to accommodate the Z dimension of 3D printing, there are at least two other sources of error that assume a greater importance, when compared with 2D printing, and we shall refer to them herein with the following terms: slope error and dynamic slope error.

5.3.2 Slope Errors

Slope errors, as defined herein, result solely from the fact that a 3D substrate, compared with a 2D substrate, has large surfaces of various non-zero slopes. These slopes are a result of the fact that a 3D substrate has substantial variability along its Z dimension.

As discussed above with respect to FIG. 8A, for 2D printing, droplets are ejected (or not ejected) according to a fixed spacing, when such spacing is measured by (or projected upon) the X or Y axis. For purposes of explaining slope error, the velocity of a nozzle ($v_{scan}$), as it moves across the substrate surface, is ignored (or one can simply imagine nozzle 810 temporarily pausing its movement, before shooting each of the droplets). This simplification permits us to assume, for purposes of explaining slope error, that each droplet moves in a straight line trajectory perpendicular to the surface of substrate 820.

For 3D printing, however, where the substrate has significant non-zero slopes over large surface areas, maintaining such fixed spacing (with respect to the X or Y axes) means that droplet density will vary with respect to the substrate's surface. This variation in droplet density is referred to herein as "slope error."

To understand why slope error occurs, it is illustrative to compare FIG. 8A with FIG. 8B. In FIG. 8B, the 3D substrate 821 is a right triangle. Along the same x distance $\Delta X_{LR1}$ as shown in FIG. 8A, four droplets are also ejected in FIG. 8B (as with FIG. 8A, $v_{scan}$ is ignored). However, as is known from the basic geometry of right triangles, the distance between the four droplets, on the sloped surface of substrate 821, is greater than in FIG. 8A.

More generally, a right triangle can be described as having a "base" and "height," that form the right angle, connected by a hypotenuse. If the length of the base is kept fixed (in the example of FIG. 8B it is fixed at $\Delta X_{LR1}$), the following can be said about the relationship between the height and hypotenuse. The hypotenuse is shortest when the height is zero, at which point the hypotenuse is of zero slope and a length equal to the base (FIG. 8A, for example, can be viewed as presenting a triangular substrate surface where the height is zero). From this flattest and shortest point, the longer the height is extended, the greater the slope and length of the hypotenuse. As long as the height is greater than zero the hypotenuse is longer than the base and thus presents a substrate surface greater than that where height is zero.

In a similar way, for each unit, of either the X or Y axis, that a printhead nozzle traverses (comparable to a right triangle's base), the greater the slope of the substrate surface traversed (comparable to a right triangle's greater height), the greater the amount of substrate surface area (comparable to a right triangle's hypotenuse) that needs to be covered. If the printhead nozzle ejects droplets according to a fixed spacing, for each unit of the X or Y axis traversed, a same number of droplets is deposited.

Figure 5C:
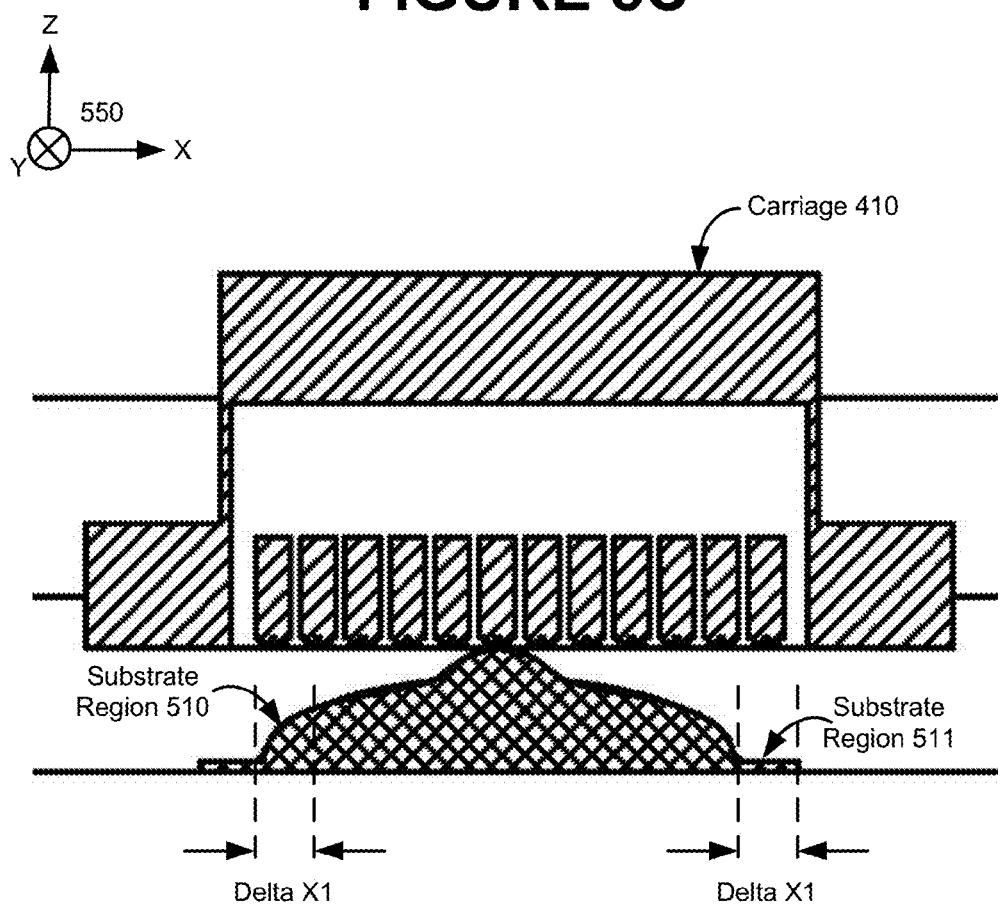
FIG. 5C presents a closeup of a substrate as presented in FIG. 5B.

Slope error can also be shown, for example, with respect to printer 401 of FIGS. 4, 5A-5B, and 6A-6B (where the printhead nozzles shoot droplets along a trajectory perpendicular to the X-Y plane). Face-shaped substrate 420 has large areas of significant non-zero slope and will therefore exhibit slope error. For example, consider FIG. 5B, that shows, at a fixed Y location, how Z changes relative to printhead scanning in the X direction. FIG. 5C presents a closeup of substrate 420, as presented in FIG. 5B. FIG. 5C focuses on two regions of substrate surface, which are labeled with numerals 510 and 511. The X dimension is the same for each of these regions, and is called "delta X1." Thus, for a printer that ejects droplets with a constant spacing, relative to the X axis, each region will receive the same number of droplets. For region 510, however, the amount of substrate area to be covered is greater than delta X1, while for region 511 the amount of substrate area to be covered is approximately equal to delta X1. Thus, region 510 will receive a lower dot density than region 511.

Slope error can be corrected during preparation of the print data by the RIP (see Section 4 "Producing Print Data"). Section 4 discusses the RIP causing particular patterns of dots to be produced, in order to achieve a desired level of tonality "t," for each appropriately-selected region "r" of a substrate's surface. With a 3D model of the substrate, the RIP can determine, for each such region, an amount by which tonality is reduced because of slope error, relative to printing on a 2D substrate. The RIP can then produce a dot pattern that, based on a 2D substrate, would produce a level of tonality for region "r" greater than "t." The increased amount of tonality is determined to be just enough such that, when subjected to the slope error reduction, the actual level of tonality is "t."

For example, assume a particular region "r1" of a surface calls for a tonality level of 50% (it is not necessary to know, for purposes of the present discussion, whether the tonality relates to monochromatic or color printing). Let us also assume that the RIP determines that a dot pattern that would produce a tonality of "t1," for 2D printing, will have its tonality reduced 20% because of the slope error introduced by r1. This means that if a dot pattern used is suitable to produce 50% tonality on a 2D substrate, the actual tonality will be only 40% in region r1. The RIP can compensate for the slope error by producing a dot pattern that would, for 2D printing, produce a tonality of 62.5%. When the 62.5% is reduced by 20%, due to the slope error, the perceived tonality is the desired 50%.

Slope error can also be corrected, at least in part, by varying droplet spacing as a function of substrate slope. Such correction can be accomplished by coordinating printhead drive pulses with a computer model of the substrate surface. Droplet spacing can be varied with respect to the X axis, Y axis or both.

5.3.3 Dynamic Slope Errors

In a 3D printing process, dynamic error (introduced above with respect to 2D printing) can combine with slope error to produce dynamic slope error.

Figure 10:
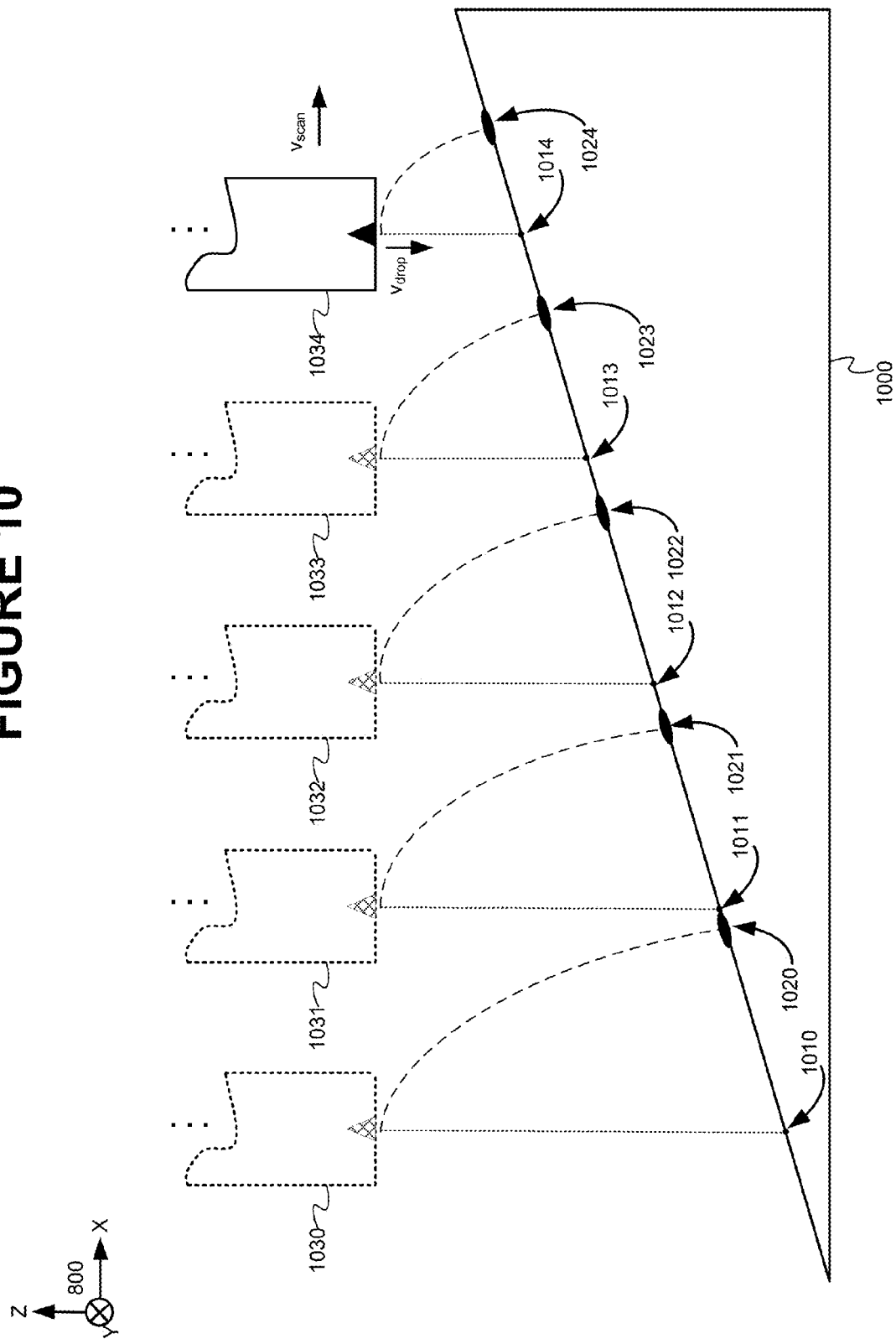
FIG. 10 depicts how dynamic and slope error can combine in a 3D printing process.

FIG. 10 depicts how dynamic and slope error can combine in a 3D printing process. FIG. 10 shows a single nozzle 1034, as it moves from left to right across the ascending surface of a substrate 1000. Phantom nozzles 1030-1033, show previous positions of nozzle 1034, at which it has already ejected a droplet. For each of the 5 droplets produced in FIG. 10, numerals 1010-1014 indicate locations of droplet impact on the substrate surface, if only slope error is considered. When dynamic error is also considered, numerals 1020-1024 indicate locations of droplet impact on the substrate surface.

Unlike 2D printing, even unidirectional 3D printing can introduce image distortions, since each droplet is not necessarily shifted by an equal amount. With dynamic slope error, since the droplet follows a curved trajectory, depending upon the distance between a printhead nozzle and the substrate surface, a different location in that trajectory can be the point of droplet impact. Thus for FIG. 10, for example, the distance between impact locations 1020 and 1021 is greater than between impact locations 1021 and 1022. This is because the droplet for 1021 had a longer distance to travel, before impacting the substrate surface, than did the droplet for 1022. The image distortion problems introduced by bidirectional 3D printing, of course, are even more complex.

The above-discussed procedure for correcting for slope error can be used, in essentially the same way, to correct for dynamic slope error. The difference is that a 3D model of the substrate is used to determine, for each appropriately-selected region of substrate surface area, an amount by which tonality is reduced (relative to 2D printing) because of dynamic slope error rather than just slope error.

Dynamic slope error can also be corrected, at least in part, by varying droplet spacing as a function of: substrate slope, nozzle distance, and droplet trajectory. Such correction can be accomplished by coordinating printhead drive pulses with a computer model of the substrate surface. As was discussed above, slope error can be corrected by coordinating the printhead drive pulses with a model of the substrate slope. For dynamic slope error, a model of droplet trajectory is also included. To utilize such trajectory model, that predicts a differing point of impact depending upon where it intersects the substrate surface, it must be coordinated with a model of the distances, between a nozzle and the substrate surface.

6 Control/Computing Systems

Figure 14:
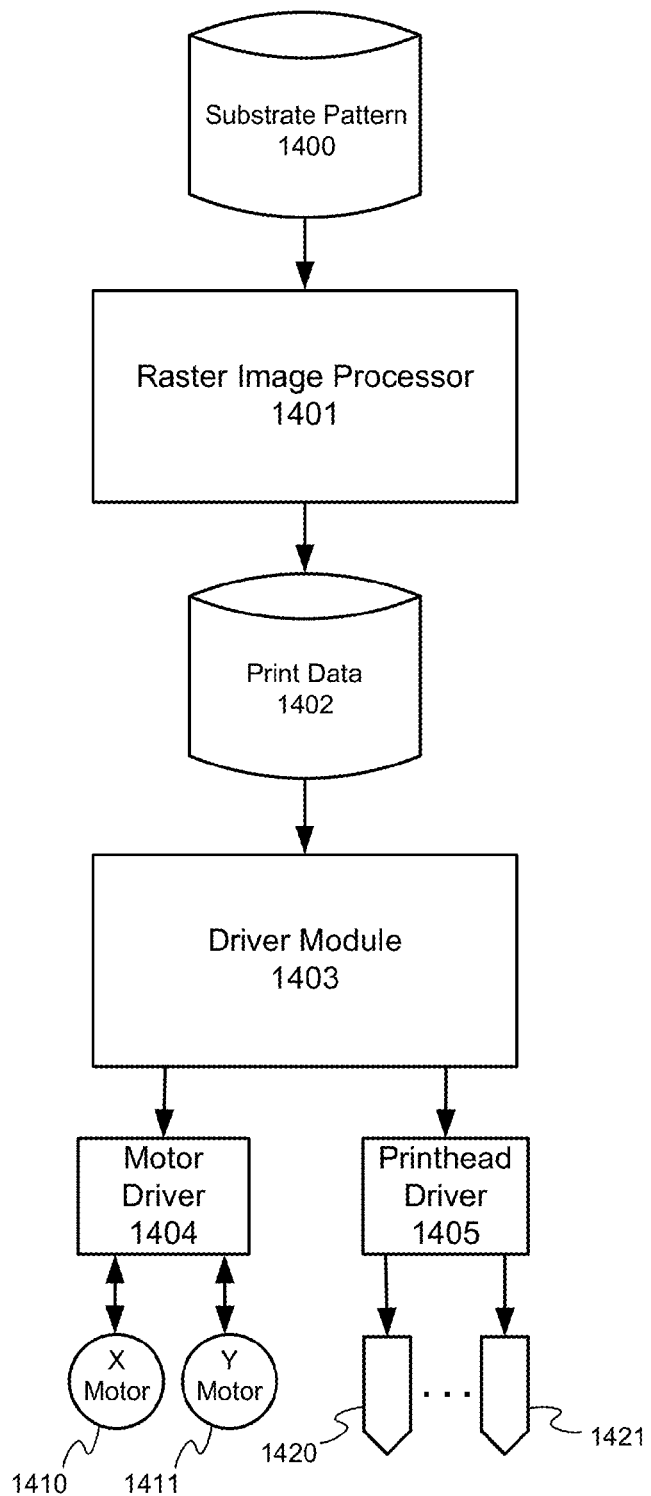
FIG. 14 shows an example control/computing system, along with FIG. 13, in which the techniques of the present invention can be implemented.

From a control/computing system perspective, the processes and apparatuses described above can be viewed as shown in FIG. 14.

A substrate pattern 1400, which can include a 3D model, can be produced in accordance with Section 2 ("Three-Dimensional Modeling"). This model can be produced with 3D modeling software executing on a general purpose computer (such as shown in FIG. 13 and described in Section 2).

Substrate pattern 1400 can be converted, by Raster Image Processor 1401 (RIP 1401), into Print Data 1402, in accordance with Section 4 ("Producing Print Data"). Example computing systems, on which RIP 1401 can be executed, include a general purpose computer or an embedded computer system.

Driver Module 1403, Motor Driver 1404, and Printhead Driver 1405, can be implemented by any suitable combination of software and hardware or by a suitable configuration of hardware alone. Typically, 1403, 1404 and 1405 are constructed to operate with the specific mechanics of the printer, such as printer 401 of FIG. 4.

Driver Module 1403 typically performs at least the following. It accepts print data (such as Print Data 1402) as input and converts the print data into appropriate control signals that are output to the motor and printhead drivers (such as Motor Driver 1404 and Printhead Driver 1405). An important function of Driver Module 1403 is the generation of drive signals, for motion of the printhead carriage and generation of ink droplets, that are appropriately coordinated in real time.

Motor Driver 1404 and Printhead Driver 1405 accept drive signals as input and produce, as output, the appropriate real world action (i.e., moving printhead carriage 410 and/or generating droplets). Motor Driver 1404 can include electronics for driving X Motor 1410 (for moving, for example, printhead carriage 410 along guide bar 412) and Y Motor 1411 (for moving, for example, table 411 relative to guide bar 412). X Motor 1410 and Y Motor 1411 can include sensors, to provide feedback-loop based servo control of the motors. Printhead Driver 1405 can include electronics for driving the printheads, within printhead carriage 410, to generate the ink droplets. Printhead Driver 1405 can be configured to drive any suitable collection of printheads, represented in FIG. 14 by having an ellipses in-between Printheads 1420 and 1421. For example, Printhead Driver 1405 can be configured to drive 24 printheads, arranged in 12 pairs, as shown in FIG. 3B.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for digital printing on a three-dimensional substrate, comprising the following steps:
    producing print data including a halftone grid pattern of dots;
    positioning a first ink jet nozzle over a region of a substrate that is of at least a first distance from the nozzle, wherein the first distance is approximately 1 cm, and the substrate is a solid material;
    propelling a first ink drop of at least a first size, from the first nozzle, to the surface of the substrate along a predictable trajectory, wherein the first size is approximately 80 pL;
    adjusting a halftone grid pattern of dots, in a selected region, from a first dot distribution to a second dot distribution, to correct for, at least in part, a variation in ink lay-down density due to a corresponding sloped area of the substrate as described by a three-dimensional model of the substrate, wherein the first and second dot distributions are defined in rows and columns of the half-tone grid pattern; and
    propelling a first plurality of droplets, corresponding to the adjusted halftone grid pattern of dots in the selected region, to the substrate in a manner similar to that of the first ink drop.

2. The method of claim 1, further comprising:
    scanning a first printhead, including the first nozzle, along a first axis at a first velocity;
    propelling the first plurality of droplets, from the first printhead at a second velocity, to the surface of the substrate along a predictable curved trajectory resulting from a combination of the first and second velocities; and
    adjusting the halftone grid pattern of dots to correct for, at least in part, a variation in ink lay-down density due to an interaction between the sloped area of the substrate and the predictable curved trajectories of the first plurality of droplets.

3. The method of claim 1, wherein the adjusting is accomplished, for a first sloped area of the substrate, by determining a first amount tonality is reduced, for the first area, relative to the first area having zero slope.

4. The method of claim 3, wherein a dot pattern, for the first area, is adjusted to a higher tonality to compensate for the first amount of tonality reduction.

5. The method of claim 4, wherein the first size is at least approximately 80 pL and no larger than, approximately, 200 pL.

6. A three-dimensional substrate, comprising ink drops applied according to the following steps:
    producing print data including a halftone grid pattern of dots;
    positioning a first ink jet nozzle over a region of a substrate that is of at least a first distance from the nozzle, wherein the first distance is approximately 1 cm, and the substrate is a solid material;
    propelling a first ink drop of at least a first size, from the first nozzle, to the surface of the substrate along a predictable trajectory, wherein the first size is approximately 80 pL;
    adjusting a halftone grid pattern of dots, in a selected region, from a first dot distribution to a second dot distribution, to correct for, at least in part, a variation in ink lay-down density due to a corresponding sloped area of the substrate as described by a three-dimensional model of the substrate:
    propelling a first plurality of droplets, corresponding to the adjusted halftone grid pattern of dots in the selected region, to the substrate in a manner similar to that of the first ink drop.
    scanning a first printhead, including the first nozzle, along a first axis at a first velocity;
    propelling the first plurality of droplets, from the first printhead at a second velocity, to the surface of the substrate along a predictable curved trajectory resulting from a combination of the first and second velocities; and
    adjusting the halftone grid pattern of dots to correct for, at least in part, a variation in ink lay-down density due to an interaction between the sloped area of the substrate and the predictable curved trajectories of the first plurality of droplets.

7. The three-dimensional substrate of claim 6, wherein the first size is at least approximately 80 pL and no larger than, approximately, 200 pL.

8. A three-dimensional substrate, comprising ink drops applied according to the following steps:
    producing print data including a halftone grid pattern of dots;
    positioning a first ink jet nozzle over a region of a substrate that is of at least a first distance from the nozzle, wherein the first distance is approximately 1 cm, and the substrate is a solid material;

propelling a first ink drop of at least a first size, from the first nozzle, to the surface of the substrate along a predictable trajectory, wherein the first size is approximately 80 pL;

adjusting a halftone grid pattern of dots, in a selected region, from a first dot distribution to a second dot distribution, to correct for, at least in part, a variation in ink lay-down density due to a corresponding sloped area of the substrate as described by a three-dimensional model of the substrate, wherein the first and second dot distributions are defined in rows and columns of the half-tone grid pattern; and propelling a first plurality of droplets, corresponding to the adjusted halftone grid pattern of dots in the selected region, to the substrate in a manner similar to that of the first ink drop.

9. The three-dimensional substrate of claim 8, wherein the adjusting is accomplished, for a first sloped area of the substrate, by determining a first amount tonality is reduced, for the first area, relative to the first area having zero slope.

10. The three-dimensional substrate of claim 9, wherein a dot pattern, for the first area, is adjusted to a higher tonality to compensate for the first amount of tonality reduction.

11. The three-dimensional substrate of claim 8, wherein the first size is at least approximately 80 pL and no larger than, approximately, 200 pL.

* * * * *